(12) United States Patent
Fukushima

(10) Patent No.: US 12,315,001 B2
(45) Date of Patent: May 27, 2025

(54) ELECTRONIC PAYMENT SYSTEM, ELECTRONIC PAYMENT METHOD, AND INFORMATION STORAGE MEDIUM

(71) Applicant: Rakuten Group, Inc., Tokyo (JP)

(72) Inventor: Sachiko Fukushima, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 474 days.

(21) Appl. No.: 17/708,055

(22) Filed: Mar. 30, 2022

(65) Prior Publication Data

US 2022/0318884 A1 Oct. 6, 2022

(30) Foreign Application Priority Data

Mar. 31, 2021 (JP) ................................ 2021-061502

(51) Int. Cl.
| | | |
|---|---|---|
| *G06Q 40/00* | (2023.01) | |
| *G06Q 20/10* | (2012.01) | |
| *G06Q 20/18* | (2012.01) | |
| *G06Q 20/40* | (2012.01) | |
| *G06Q 30/0601* | (2023.01) | |

(52) U.S. Cl.
CPC ....... *G06Q 30/0633* (2013.01); *G06Q 20/102* (2013.01); *G06Q 20/18* (2013.01); *G06Q 20/4015* (2020.05); *G06Q 20/40145* (2013.01)

(58) Field of Classification Search
CPC ........... G06Q 30/0633; G06Q 20/4015; G06Q 20/102; G06Q 20/18
See application file for complete search history.

(56) References Cited

U.S. PATENT DOCUMENTS

| | | | | |
|---|---|---|---|---|
| 9,373,091 | B1* | 6/2016 | Belser | .................... G06Q 10/00 |
| 10,026,083 | B1* | 7/2018 | Varma | ................ G06Q 20/3224 |
| 10,915,905 | B1* | 2/2021 | Callender | ........... G06F 16/1865 |
| 11,132,661 | B1* | 9/2021 | White, III | ......... H04M 15/7652 |
| 2011/0173041 | A1* | 7/2011 | Breitenbach | ........... B67D 7/348 |
| | | | | 705/26.1 |

(Continued)

FOREIGN PATENT DOCUMENTS

| | | |
|---|---|---|
| JP | 2010-231583 A | 10/2010 |
| JP | 2020-160689 A | 10/2020 |

(Continued)

OTHER PUBLICATIONS

Thorbecke, "Amazon opens a grocery store with no cashiers," https://abcnews.go.com/Business/amazon-opens-grocery-store-cashiers/story?id=69199966, including embedded video. (Year: 2020).*

(Continued)

*Primary Examiner* — Abhishek Vyas
*Assistant Examiner* — William B. Bunker
(74) *Attorney, Agent, or Firm* — Sughrue Mion, PLLC

(57) ABSTRACT

Provided is an electronic payment system which receives a payment request for electronic payment when a user visits a predetermined place to use a series of services, the electronic payment system including at least one processor configured to: determine, depending on the user, which one of real-time payment to be executed for each payment request or lump-sum payment to be collectively executed for a plurality of payment requests is to be executed; and execute one of the real-time payment or the lump-sum payment based on a result of the determination.

19 Claims, 20 Drawing Sheets

(56) References Cited

U.S. PATENT DOCUMENTS

| | | | |
|---|---|---|---|
| 2016/0092862 A1* | 3/2016 | Jaeb | G06Q 20/325 |
| | | | 705/39 |
| 2020/0051052 A1* | 2/2020 | Kimura | G06Q 20/3224 |
| 2020/0265501 A1* | 8/2020 | Burks | A47J 31/46 |
| 2020/0311730 A1 | 10/2020 | Yamada | |
| 2020/0327531 A1* | 10/2020 | Rogers | G06Q 20/3224 |
| 2022/0067679 A1* | 3/2022 | Sandberg | G06Q 20/32 |
| 2024/0135350 A1* | 4/2024 | Eaton | G06Q 20/123 |
| 2024/0346568 A1* | 10/2024 | Burt | G06Q 30/0207 |

FOREIGN PATENT DOCUMENTS

| | | | | |
|---|---|---|---|---|
| JP | 2020191041 | * | 11/2020 | G06Q 30/06 |
| KR | 100832817 | * | 5/2008 | G06Q 50/10 |
| KR | 20140087232 | * | 7/2014 | G06Q 50/10 |
| WO | WO-2015023713 A2 | * | 2/2015 | G06Q 10/02 |

OTHER PUBLICATIONS

Anonymous, "Mobile Ordering," Washington Nationals, https://web.archive.org, Mar. 31, 2021 (Year: 2021).*
Anna Wolfe, "Five Stadiums Add Mobile Ordering," Hospitality Technology, 2020 (Year: 2020).*
IBM, "Pervasive Ordering System for Stadiums," ip.com, IPCOMM000014549D, 2001 (Year: 2001).*
Office Action dated Apr. 19, 2022 from the Japanese Patent Office in JP Application No. 2021-061502.

* cited by examiner

| USER ID | PASSWORD | CODE ID | EXPIRATION TIME | FULL NAME | PAYMENT INFORMATION ||||| 
|---|---|---|---|---|---|---|---|---|---|
| | | | | | PAYMENT SOURCE INFORMATION | PAYMENT SCHEME | CREDIT CARD INFORMATION | ELECTRONIC MONEY INFORMATION | ELECTRONIC CASH INFORMATION |
| taro.yamada123 | ******** | 1382 0415 8913 4321 | 2021/3/27 17:30:05 | TARO YAMADA | CREDIT CARD X | LUMP-SUM PAYMENT | CREDIT CARD INFORMATION1 | ELECTRONIC MONEY INFORMATION 1 | ELECTRONIC CASH INFORMATION 1 |
| hanako999 | ****** | 2521 3921 1542 9916 | 2021/3/27 16:58:23 | HANAKO ITO | ELECTRONIC MONEY | REAL-TIME PAYMENT | CREDIT CARD INFORMATION2 | ELECTRONIC MONEY INFORMATION 2 | ELECTRONIC CASH INFORMATION 2 |
| ... | ... | ... | ... | ... | ... | ... | ... | ... | ... |

USAGE HISTORY

| LUMP-SUM PAYMENT FLAG | DATE/TIME OF USAGE | PAYEE | USAGE AMOUNT | ITEM INFORMATION | CHECK-IN INFORMATION |||
|---|---|---|---|---|---|---|---|
| | | | | | PLACE OF CHECK-IN | CHECK-IN DATE/TIME | CHECK-OUT DATE/TIME |
| ... | ... | ... | ... | ... | ... | ... | ... |
| 1 | 2021/3/27 13:30:25 | SELLER 1 | 300 YEN | TEA | | | |
| 1 | 2021/3/27 13:51:42 | STORE 1 | 1200 YEN | TOWEL | | | |
| 1 | 2021/3/27 13:58:11 | STORE 2 | 1500 YEN | LUNCH BOX | | | |
| ... | ... | ... | ... | ... | ... | ... | ... |
| 0 | 2021/3/27 13:22:14 | STORE 5 | 500 YEN | HANDKERCHIEF | ZZZ STADIUM | 2021/3/27 13:20:01 | - |
| 0 | 2021/3/27 13:40:23 | STORE 1 | 450 YEN | FRENCH FRIES | | | |
| 0 | 2021/3/27 14:13:00 | VENDING MACHINE 3 | 200 YEN | JUICE | | | |
| ... | ... | ... | ... | ... | ZZZ STADIUM | 2021/3/27 13:10:14 | - |
| ... | ... | ... | ... | ... | ... | ... | ... |

FIG.9

| USER ID | PASSWORD | FULL NAME | ORDER INFORMATION ||||  CHECK-IN INFORMATION |||
|---|---|---|---|---|---|---|---|---|
| | | | GAME DATE/TIME | SEAT | PRICE | PLACE OF CHECK-IN | CHECK-IN DATE/TIME | CHECK-OUT DATE/TIME |
| taro.yamada123 | ****** | TARO YAMADA | 2021/3/27 14:00 | INFIELD RESERVED SEAT, THIRD BASE SIDE… | 5,000 YEN | ZZZ STADIUM | 2021/3/27 13:20:01 | - |
| hanako999 | ***** | HANAKO ITO | 2021/3/27 14:00 | INFIELD RESERVED SEAT, FIRST BASE SIDE… | 4,500 YEN | ZZZ STADIUM | 2021/3/27 13:10:14 | - |
| ⋮ | ⋮ | ⋮ | ⋮ | ⋮ | ⋮ | ⋮ | ⋮ | ⋮ |

DB2

ELECTRONIC PAYMENT SYSTEM, ELECTRONIC PAYMENT METHOD, AND INFORMATION STORAGE MEDIUM

CROSS-REFERENCE TO RELATED APPLICATION

The present application claims priority from Japanese application JP 2021-061502 filed on Mar. 31, 2021, the content of which is hereby incorporated by reference into the application.

BACKGROUND OF THE INVENTION

1. Field of the Invention

The present disclosure relates to an electronic payment system, an electronic payment method, and an information storage medium.

2. Description of the Related Art

Hitherto, there has been known a technology for enhancing convenience of electronic payment. For example, in JP 2020-160689 A, there is described a system in which, when a user visits a restaurant, the user is allowed to check in at this restaurant by causing a payment terminal arranged on a table at this restaurant to read a two-dimensional code displayed by a restaurant app on a user terminal. The user can use the user terminal to give instructions to place an order at the checked-in restaurant and to execute electronic payment at a time of leaving this restaurant.

SUMMARY OF THE INVENTION

There are some users who wish to execute electronic payment for a series of services used at a place visited by the user himself or herself each time, and some users who wish to execute the electronic payment collectively. However, with the technology as described in JP 2020-160689 A, the electronic payment corresponding to a total amount for individual orders at the restaurant checked in by the user is only executed at the time of leaving the restaurant, and hence the convenience of the user cannot be sufficiently enhanced.

One object of the present disclosure is to enhance convenience of electronic payment to be executed when a user visits a predetermined place to use a series of services.

According to at least one embodiment of the present disclosure, there is provided an electronic payment system which receives a payment request for electronic payment when a user visits a predetermined place to use a series of services, the electronic payment system including at least one processor configured to: determine, depending on the user, which one of real-time payment to be executed for each payment request or lump-sum payment to be collectively executed for a plurality of payment requests is to be executed; and execute one of the real-time payment or the lump-sum payment based on a result of the determination.

BRIEF DESCRIPTION OF THE DRAWINGS

FIG. 4 is a diagram for illustrating an example of how a user visits a stadium and checks in.

FIG. 8 is a table for showing a data storage example of a first database.

FIG. 9 is a table for showing a data storage example of a second database.

DETAILED DESCRIPTION OF THE INVENTION

1. Overall Configuration of Electronic Payment System

Figure 1:
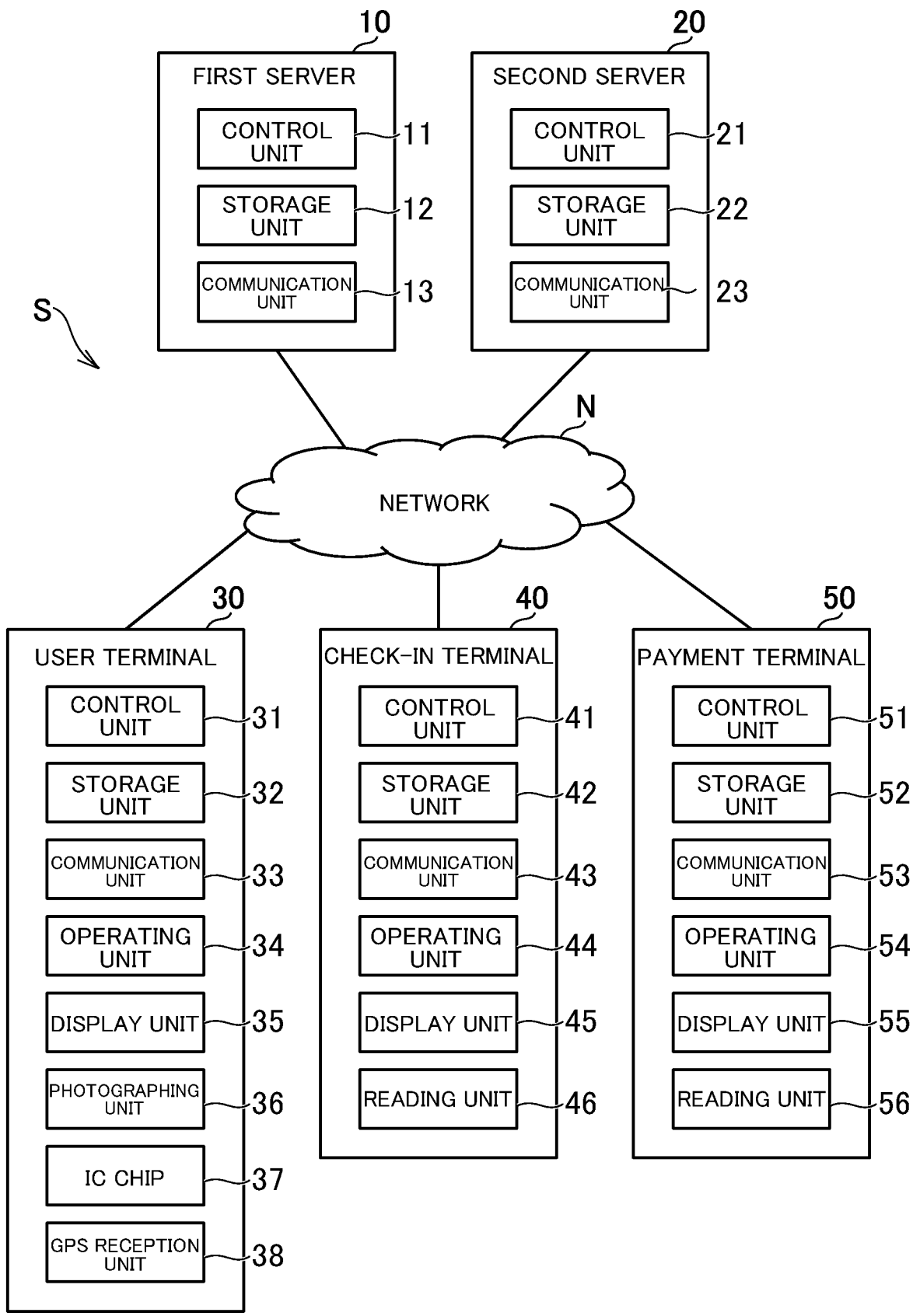
FIG. 1 is a diagram for illustrating an example of an overall configuration of an electronic payment system.

An example of an electronic payment system according to at least one embodiment of the present disclosure is described. FIG. 1 is a diagram for illustrating an example of an overall configuration of the electronic payment system. As illustrated in FIG. 1, an electronic payment system S includes a first server 10, a second server 20, a user terminal 30, a check-in terminal 40, and a payment terminal 50. Those components can be connected to a network N such as the Internet. It suffices that the electronic payment system S includes at least one computer, and the electronic payment system S is not limited to the example of FIG. 1.

The first server 10 is a server computer for a first service. The first service is a service that provides electronic payment. The first service is not limited to a service that provides only a function of electronic payment, and may provide the function of electronic payment together with other functions including, for example, a social networking service (SNS).

The first server 10 includes a control unit 11, a storage unit 12, and a communication unit 13. The control unit 11 includes at least one processor. The storage unit 12 includes a volatile memory such as a RAM, and a nonvolatile memory such as a hard disk drive. The communication unit 13 includes at least one of a communication interface for wired communication or a communication interface for wireless communication.

The second server 20 is a server computer for a second service. In the at least one embodiment, a ticket sales service is described as an example of the second service. The second service is a service that can be linked to the first service. The second service is a service different from the first service. The second service is not limited to the example in the at least one embodiment, and may be any service. The second server 20 includes a control unit 21, a storage unit 22, and a communication unit 23. Physical configurations of the control unit 21, the storage unit 22, and the communication unit 23 are the same as those of the control unit 11, the storage unit 12, and the communication unit 13, respectively.

The user terminal 30 is a computer to be operated by a user. For example, the user terminal 30 is a smartphone, a tablet terminal, a wearable terminal, or a personal computer. The user terminal 30 includes a control unit 31, a storage unit 32, a communication unit 33, an operating unit 34, a display unit 35, a photographing unit 36, an IC chip 37, and a GPS reception unit 38. Physical configurations of the control unit 31, the storage unit 32, and the communication unit 33 are the same as those of the control unit 11, the storage unit 12, and the communication unit 13, respectively.

The operating unit 34 is an input device such as a touch panel. The display unit 35 is a liquid crystal display or an organic EL display. The photographing unit 36 includes at least one camera. The IC chip 37 may be a chip of any standards, for example, a chip of FeliCa (trademark) or a chip of a so-called Type A or Type B among the non-contact type standards. The GPS reception unit 38 includes a receiver which receives signals from satellites. The GPS reception unit 38 is used to acquire a current position or a current date and time.

The check-in terminal 40 is a computer arranged at a place to be visited by the user. For example, the check-in terminal 40 is a personal computer, a tablet terminal, or a smartphone. The check-in terminal 40 includes a control unit 41, a storage unit 42, a communication unit 43, an operating unit 44, a display unit 45, and a reading unit 46. Physical configurations of the control unit 41, the storage unit 42, the communication unit 43, the operating unit 44, and the display unit 45 are the same as those of the control unit 11, the storage unit 12, the communication unit 13, the operating unit 34, and the display unit 35, respectively. The reading unit 46 includes a code reader or a camera. The reading unit 46 may be connected to the outside of the check-in terminal 40.

The payment terminal 50 is a computer for executing electronic payment. For example, the payment terminal 50 is a POS terminal, a personal computer, a tablet terminal, or a smartphone. The payment terminal 50 includes a control unit 51, a storage unit 52, a communication unit 53, an operating unit 54, a display unit 55, and a reading unit 56. Physical configurations of the control unit 51, the storage unit 52, the communication unit 53, the operating unit 54, the display unit 55, and the reading unit 56 are the same as those of the control unit 11, the storage unit 12, the communication unit 13, the operating unit 34, the display unit 35, and the reading unit 46, respectively.

A program or data stored in each of the first server 10, the second server 20, the user terminal 30, the check-in terminal 40, and the payment terminal 50 may be supplied through the network N. Further, a program or data stored in an information storage medium may be supplied thereto through a reading unit (for example, optical disc drive or memory card slot) for reading a computer-readable information storage medium or an input/output unit (for example, USB port) for inputting and outputting data to/from an external device.

2. Outline of Electronic Payment System

In the at least one embodiment, a case in which electronic payment is executed based on a first app being an application for the first service is described. The first app is installed on the user terminal 30. Payment means that can be used for electronic payment may be payment means of any type, for example, credit card, debit card, electronic money, electronic cash, points, bank account, wallet, cryptocurrency, or a combination thereof.

In the first service, electronic payment may be executed through use of the IC chip 37 of the user terminal 30. In the first service, electronic payment may be executed through use of a physical card, such as an IC card or a magnetic card, without the use of the user terminal 30. In the first service, electronic payment may be executed through use of the user himself or herself (that is, through use of biometric authentication) instead of an object owned by the user. Any payment means can be used for those kinds of electronic payment as well.

In the second service, a purchase order for a ticket placed by the user is received. The ticket itself sold in the second service may be any ticket that can be managed by a publicly known ticket agency. For example, in the second service, tickets for sports games, concerts, plays, other events, movie theaters, museums, or the like are sold. In the at least one embodiment, a case in which the user purchases a ticket for a baseball game through use of the second service is taken as an example. First, the user logs in to the second service and purchases a ticket.

Figure 2:
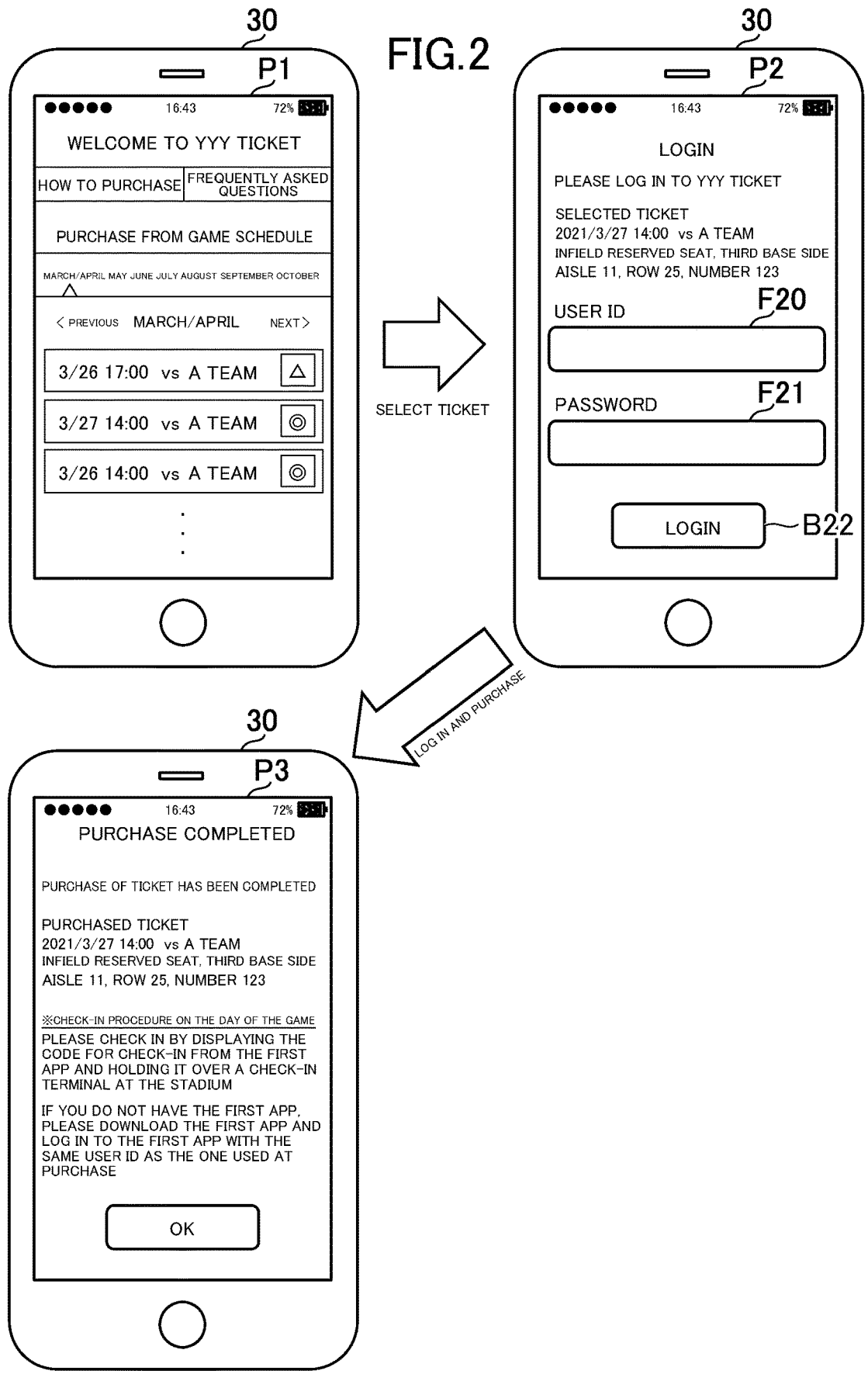
FIG. 2 is a view for illustrating an example of a procedure for purchasing a ticket from a second service.

FIG. 2 is a diagram for illustrating an example of a procedure for purchasing the ticket from the second service. As illustrated in FIG. 2, when the user accesses the second server 20 from the user terminal 30, a top page P1 of the second service is displayed. The user inputs search conditions from the top page P1 at discretion to search for a desired ticket. When the user has placed the purchase order for the desired ticket, a login page P2 of the second service is displayed.

In the at least one embodiment, a user ID and a password that are common to the first service and the second service are used. The user can log in to both the first service and the second service with a pair of the user ID and the password. When the user inputs the user ID and the password to input forms F20 and F21, respectively, and selects a button B22, the user logs in to the second service. When the user performs a payment procedure after having logged in to the second service, the purchase of the ticket is completed. The user may use the first service to pay the price of the ticket, or may use other payment means registered in the second service to pay the price of the ticket.

When the purchase of the ticket has been completed, a purchase completion page P3 indicating that the purchase of the ticket has been completed is displayed on the user terminal 30. In the at least one embodiment, the user checks in to a stadium through use of the first app instead of having the ticket printed on paper. The purchase completion page P3 informs the user of contents of his or her purchase and a check-in method on the day. The user may use the first service from a browser. In this case, the check-in may be executed through use of a screen of the browser.

Figure 3:
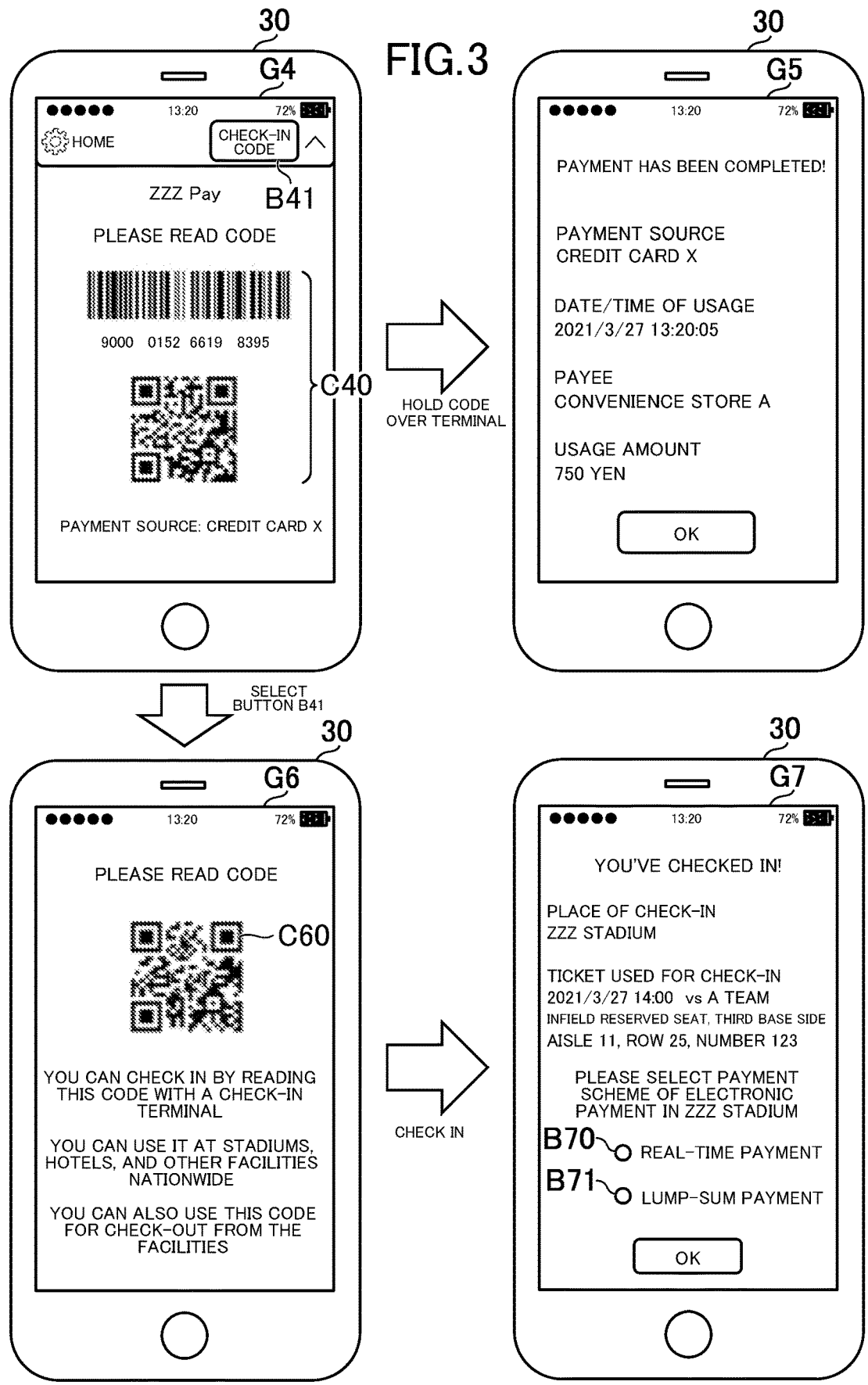
FIG. 3 is a view for illustrating an example of screens to be displayed from a first app.

FIG. 3 is a diagram for illustrating an example of screens to be displayed from the first app. When the user operates the user terminal 30 to activate the first app, processing for logging in to the first service is executed between the first server 10 and the user terminal 30. The user ID and the password may be requested to be input at a timing at which the first app is activated. In the at least one embodiment, a case in which the input of the user ID and the password is omitted because the user has already logged in to the first service before is described.

As illustrated in FIG. 3, when the user logs in to the first service, a home screen G4 of the first app is displayed. A code C40 for electronic payment is displayed on the home screen G4. The code C40 includes an ID that can identify the user in the first service. This ID may be the user ID described above, but in the at least one embodiment, a case in which information different from the user ID is used is described. This ID is hereinafter referred to as "code ID."

An expiration time is set for the code ID. When the expiration time of a certain code ID is reached, the first server 10 issues a new code ID to update the code ID and the expiration time. The code ID and the expiration time are held in the first server 10 in association with the user ID. The expiration time is not required to be set for the code ID. The code C40 may include information other than the code ID. For example, the code C40 may include information that can be identified as a code for electronic payment. The first server 10 may identify based on this information that the execution of electronic payment has been requested.

The user can execute electronic payment through use of the code C40. For example, when the user checks in to the stadium and then causes the payment terminal 50 to read the code C40, the user can execute electronic payment based on payment means set in advance (credit card in FIG. 3). The code C40 can be used for electronic payment at any place other than the stadium. As illustrated in FIG. 3, when the user executes electronic payment through use of the code C40, a payment completion screen G5 indicating that the electronic payment has been completed is displayed. On the payment completion screen G5, payment means used as a payment source, a date/time of usage, a payee, and a usage amount are displayed.

As a method itself of executing electronic payment, various methods can be used. For example, there can be used a method of reading a code displayed on the payment terminal 50 by the user terminal 30, a method of reading a code printed on paper or the like and posted in a store by the user terminal 30, a method of holding the IC chip 37 of the user terminal 30 over a reader/writer of the payment terminal 50, or a method of completing the electronic payment only by an operation with respect to the user terminal 30.

As illustrated in FIG. 3, the home screen G4 includes a button B41 for displaying a code for check-in. When the user selects the button B41, a display screen G6 including a code C60 for check-in is displayed on the display unit 35. The code C60 includes a code ID. The code C60 may include information other than the code ID. For example, the code C60 may include information that can be identified as a code for the check-in. The first server 10 may identify based on this information that check-in has been requested to be executed. The code ID included in the code C40 and the code ID included in the code C60 may differ from each other. That is, a plurality of code IDs may be issued.

As indicated on the display screen G6, the code C60 can be used for check-in to stadiums nationwide. The code C60 can also be used for check-in to facilities other than the stadiums. For example, when the first service is affiliated with a travel reservation service (that is, when the second service is a travel reservation service), the user can check in to a hotel reserved with the travel reservation service through use of the code C60. In the at least one embodiment, when the user visits the stadium on the day of the game, the user activates the first app to display the code C60 on the display screen G6.

Figure 4:
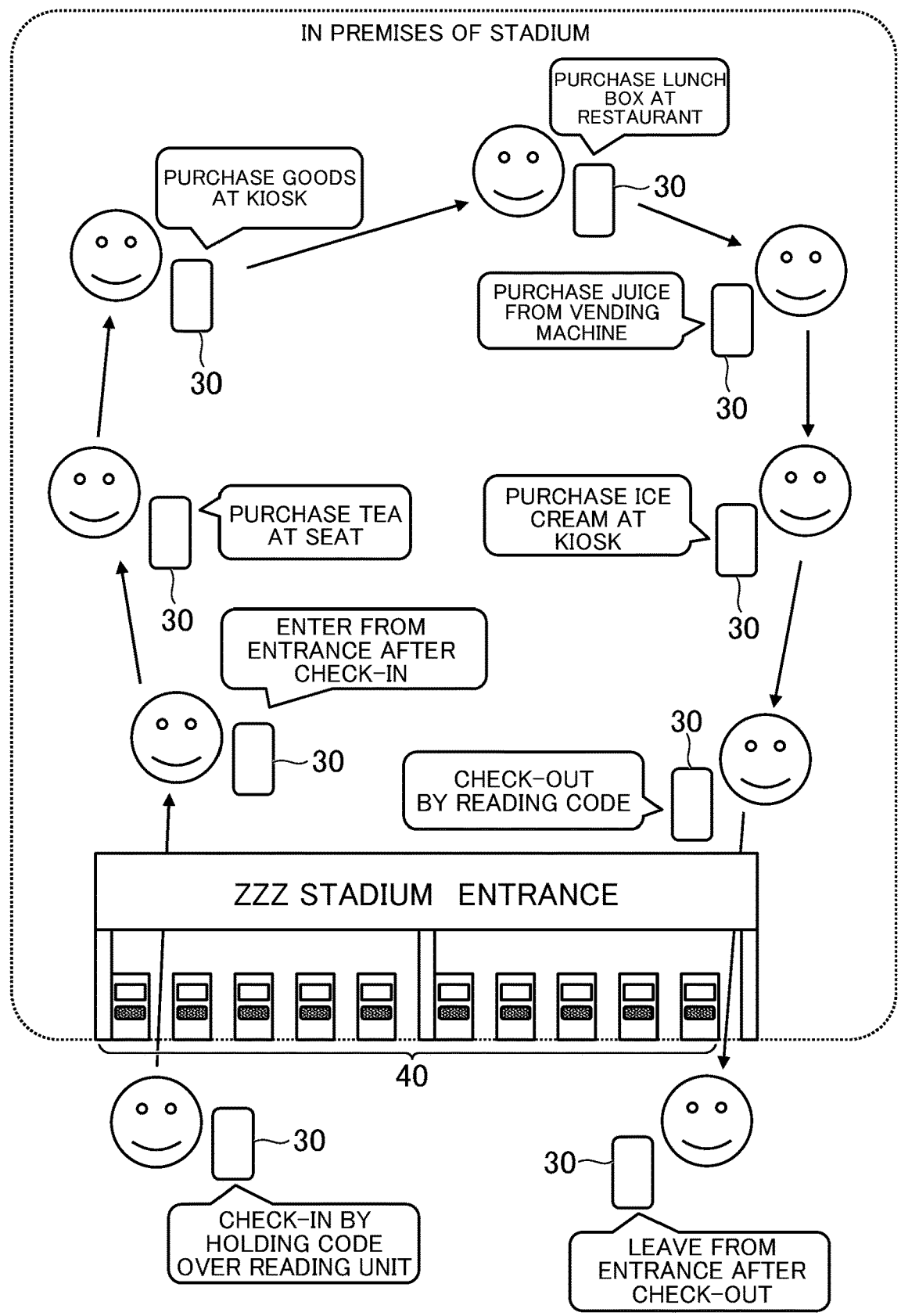

FIG. 4 is a diagram for illustrating an example of how the user visits the stadium and checks in. As illustrated in FIG. 4, the user holds the code C60 over the reading unit 46 of the check-in terminal 40 arranged at an entrance of the stadium. When the check-in terminal 40 reads the code C60 by the reading unit 46, the check-in terminal 40 transmits the code ID included in the code C60 to the first server 10. The first server 10 identifies the user ID associated with the code ID, and transmits this user ID to the second server 20.

The second server 20 acquires contents of the ticket associated with the user ID received from the first server 10, and executes check-in. When the check-in has been completed, a check-in completion screen G7 indicating that the check-in has been completed is displayed on the user terminal 30 as illustrated in FIG. 3. On the check-in completion screen G7, details of the ticket purchased by the user are displayed. When the check-in has been completed, the check-in terminal 40 may issue the ticket purchased by the user from a printer connected to the check-in terminal 40.

In the at least one embodiment, as a payment scheme at the stadium, the user can select any one of real-time payment for executing electronic payment at the stadium each time or lump-sum payment for collectively executing electronic payment requested after the check-in and before the check-out. For example, on the check-in completion screen G7 of FIG. 3, a button B70 for selecting the real-time payment and a button B71 for selecting the lump-sum payment are displayed. The user can change the payment scheme selected at the check-in during his or her stay at the stadium. When the user does not select anything, a preset one of the real-time payment and the lump-sum payment is automatically selected.

Referring back to FIG. 4, when the check-in has been completed, the user enters the stadium from the entrance. In the at least one embodiment, the payment terminal 50 is arranged at each of a plurality of positions in the stadium. The payment terminal 50 may be arranged outside the stadium as long as the payment terminal 50 is arranged near the stadium. The user can move to any position in the stadium to purchase a product through use of the first app. When a seller moving in the stadium can handle electronic payment, the seller may carry a portable payment terminal 50 around.

Figure 5:
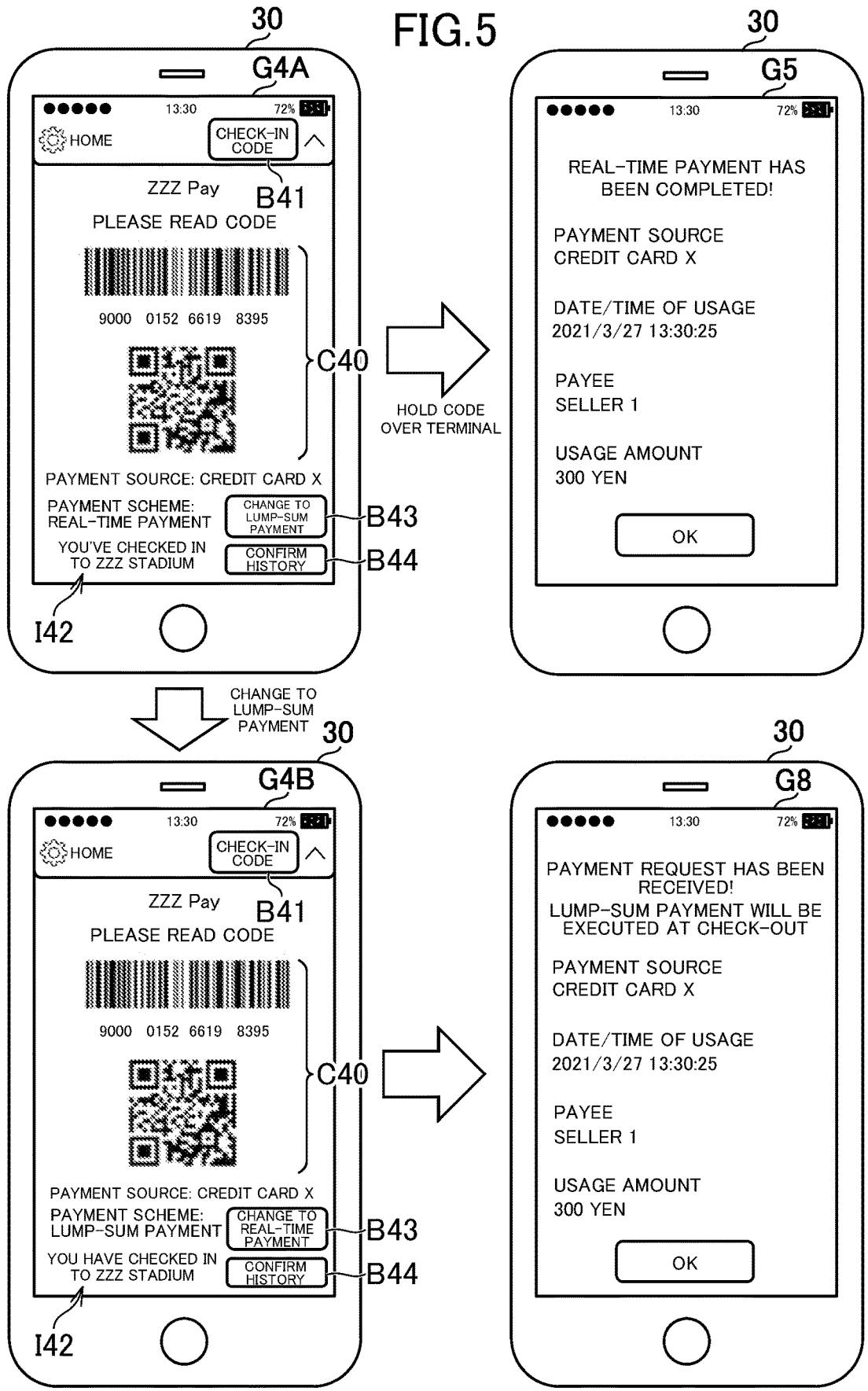
FIG. 5 is a view for illustrating an example of the screens of the first app to be displayed when the user executes electronic payment at the stadium.
Figure 6:
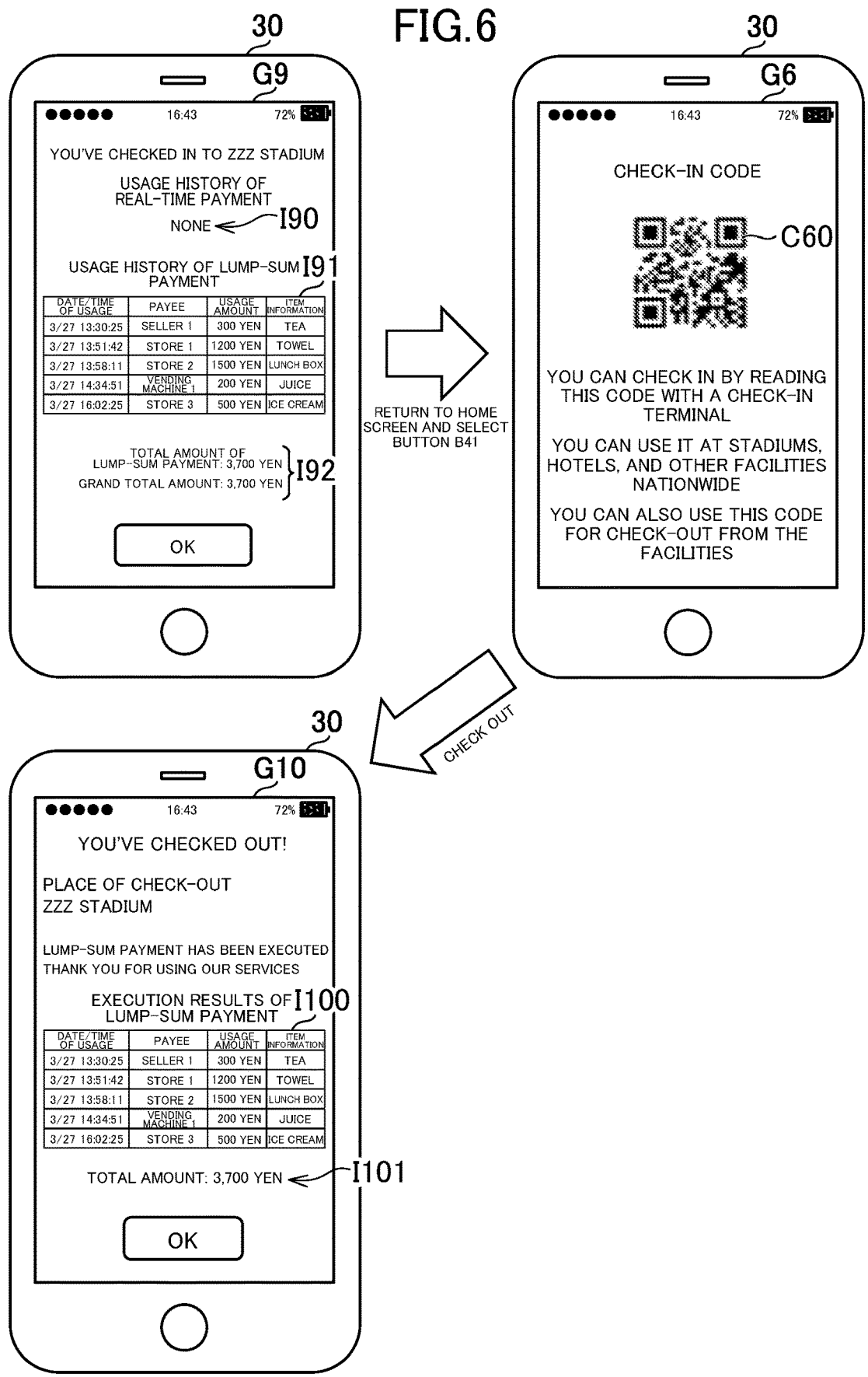
FIG. 6 is a view for illustrating an example of the screens of the first app to be displayed when the user executes electronic payment at the stadium.

FIG. 5 and FIG. 6 are each a view for illustrating an example of the screens of the first app to be displayed when the user executes electronic payment at the stadium. As illustrated in FIG. 5, when the user checks in to the stadium, an information piece 142 indicating the checked-in stadium, a button B43 for changing the payment scheme, and a button B44 for confirming a usage history of electronic payment at the stadium are displayed on the home screen G4. A home screen G4A of FIG. 5 indicates a case in which the real-time payment has been selected, and a home screen G4B indicates a case in which the lump-sum payment has been selected.

When the code C40 is read by the payment terminal 50 under a state of the home screen G4A, the real-time payment is executed, and the payment completion screen G5 is displayed. The payment completion screen G5 of FIG. 5 indicates a case in which the user has selected the real-time payment and has purchased a product from a seller in the stadium. When the user purchases a product by the real-time payment, the electronic payment for this product is executed immediately. In the example of the payment completion screen G5 of FIG. 5, credit card payment for a product of 300 yen purchased by the user is immediately executed.

When the user selects the button B43 under the state of the home screen G4A, the payment scheme is changed to the lump-sum payment (state of the home screen G4B). When the user selects the button B43 again, the payment scheme can be returned to the real-time payment. When the user changes the payment scheme, the change of the payment scheme is notified to the first server 10 to enable the first server 10 to identify the selected payment scheme. The code C40 may include information that can identify the payment scheme selected by the user. The first server 10 may identify the payment scheme selected by the user based on this information.

When the code C40 is read by the payment terminal 50 under a state of the home screen G4B, a reception completion screen G8 indicating that a payment request for the lump-sum payment has been received is displayed. The reception completion screen G8 of FIG. 5 indicates a case in which the user has selected the lump-sum payment and has purchased a product from a seller in the stadium. When the user purchases a product by the lump-sum payment, the electronic payment for this product is temporarily suspended without being executed immediately. In the example of the reception completion screen G8 of FIG. 5, the credit card payment for the product of 300 yen purchased by the user is not executed immediately. This credit card payment is collectively executed together with other products when the user checks out from the stadium.

For example, as illustrated in FIG. 4, it is assumed that the user executes the lump-sum payment for tea purchased from a seller who has stopped by the user's seat, goods purchased at a kiosk, a lunch box purchased at a restaurant, juice purchased from a vending machine, and ice cream purchased at a kiosk. The payment scheme is the lump-sum payment, and hence the electronic payment for those five products is temporarily suspended without being executed immediately. The user can confirm details of the suspended lump-sum payment from the first app. For example, when the user selects the button B44 of FIG. 5, the screen transitions to FIG. 6 to display a history confirmation screen G9 for confirming the usage history of the electronic payment at the stadium.

On the history confirmation screen G9, an information piece I90 indicating the usage history of the real-time payment, an information piece I91 indicating the usage history of the lump-sum payment, and an information piece I92 indicating a total amount of the lump-sum payment and a grand total amount are displayed. In the example of FIG. 6, the user has not executed the real-time payment, and "None" is displayed in the information piece I90. For example, when the user changes the payment scheme to the real-time payment and purchases a product, the date/time of usage, payee, usage amount, and item information of the real-time payment corresponding to this product are displayed as the information piece I90. In accordance with the purchase of this product, the grand total amount indicated in the information piece I92 is also updated.

In the example of FIG. 6, the five products described with reference to FIG. 4 have been purchased by the lump-sum payment, and hence the date/time of usage, payee, usage amount, and item information of the lump-sum payment corresponding to each of those five products are displayed as the information piece I91. The information piece I92 indicating the total amount of those five usage amounts is also displayed on the history confirmation screen G9. The information piece I92 is updated each time the user executes the lump-sum payment at the stadium.

While confirming the history confirmation screen G9, the user uses a series of services at the stadium by the real-time payment or the lump-sum payment. The service provided at the stadium is not limited to a product sales service, and may be any service. As illustrated in FIG. 4, when the game is over, the user holds the code C60 (display screen G6 of FIG. 6) over the reading unit 46 of the check-in terminal 40 to check out from the stadium. A flow at a time of the check-out is the same as a flow at a time of the check-in. When the second server 20 identifies a user who has checked out through the first server 10, the second server 20 executes processing for the check-out.

In the at least one embodiment, the lump-sum payment is executed when the user checks out from the stadium. In the example of FIG. 6, the suspended electronic payment for the five products is executed at one time. In the at least one embodiment, a case in which five times of credit card payment corresponding to the five products are executed one after another is described, but the total amount for the five products may be executed by one time of credit card payment. In a case of executing one-time credit card payment, it is assumed that appropriate usage amounts are remitted to respective companies which have sold the five products internally by the electronic payment system S.

In the lump-sum payment, the payment scheme may differ for each individual electronic payment. For example, it may be possible to use electronic money payment only for a towel of FIG. 6 and use credit card payment for the other products. When the check-out has been completed, the check-out completion screen G10 is displayed, and the user leaves the stadium from the entrance. On the check-out completion screen G10, an information piece I100 indicating details of execution results of the lump-sum payment and an information piece I101 indicating the total amount of the lump-sum payment are displayed.

As described above, the electronic payment system S according to the at least one embodiment is configured so that the user can select any one of the real-time payment or the lump-sum payment as the payment scheme at the stadium. This can enhance the convenience of electronic payment to be executed when a user visits a stadium to use a series of services. This technology is described below in detail.

3. Functions Implemented by Electronic Payment System

Figure 7:
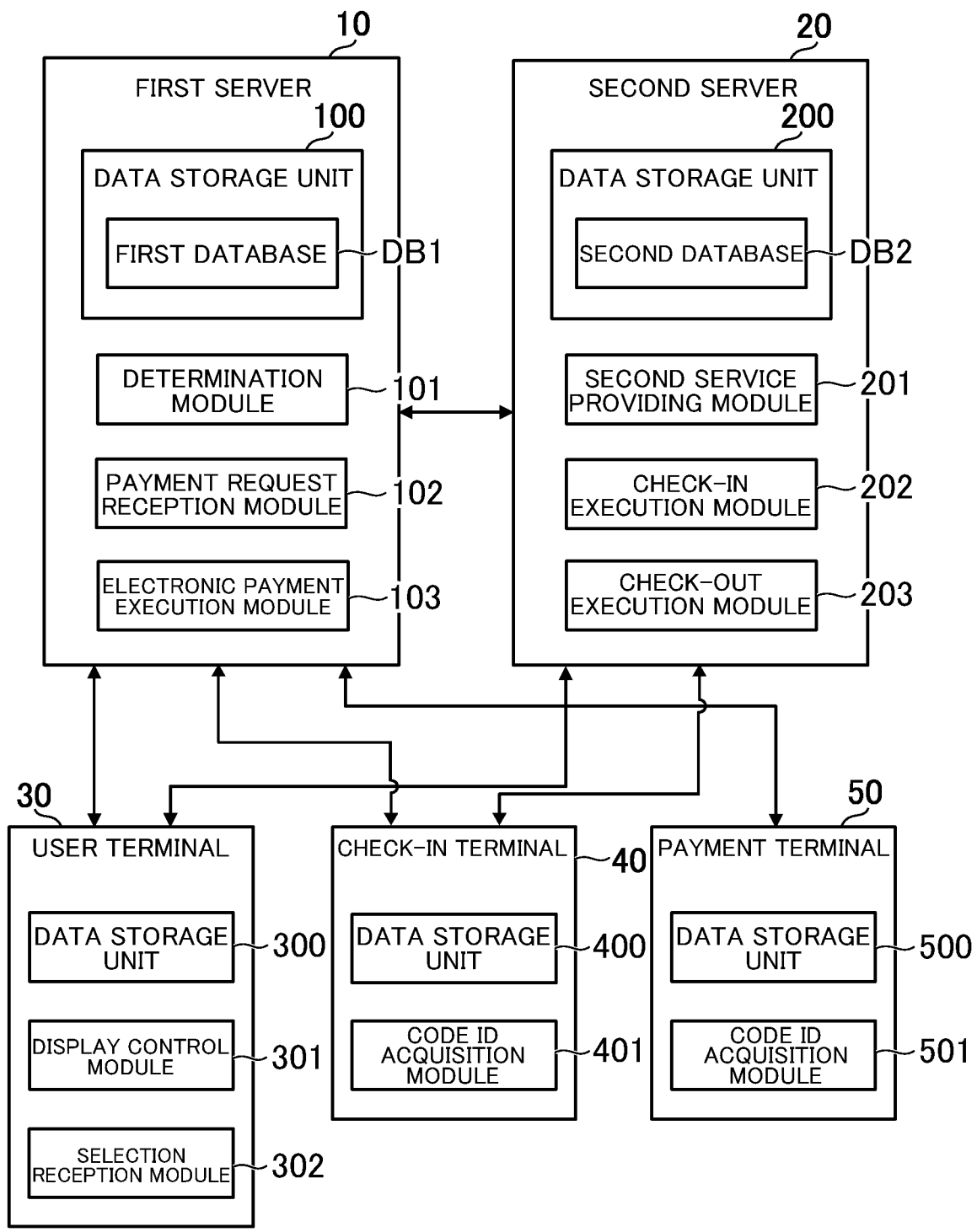
FIG. 7 is a functional block diagram for illustrating an example of functions implemented by the electronic payment system.

FIG. 7 is a functional block diagram for illustrating an example of functions implemented by the electronic payment system S.

[3-1. Functions Implemented on First Server]

As illustrated in FIG. 7, on the first server 10, a data storage unit 100, a determination module 101, a payment request reception module 102, and an electronic payment execution module 103 are implemented. The data storage unit 100 is implemented mainly by the storage unit 12. Each of the determination module 101, the payment request reception module 102, and the electronic payment execution module 103 is implemented mainly by the control unit 11.

[Data Storage Unit]

The data storage unit 100 stores data required for providing the first service to the user and data required for the check-in of the user. For example, the data storage unit 100 stores a first database DB1.

FIG. 8 is a table for showing a data storage example of the first database DB1. As shown in FIG. 8, the first database DB1 is a database in which information relating to users who have set the use of the first service is stored. For example, the first database DB1 stores a user ID, a password, a code ID, an expiration time, a full name, payment information, a usage history of the first service, and check-in information.

The user ID is an example of second information. Accordingly, the user ID as used herein can be read as "second information." The second information is not limited to the user ID, and may be any information that can identify the user by at least the second service. For example, the second information may be information called by another name such as "user account" instead of the information called "ID," or an email address may be used as the second information. In addition, for example, the second information may be a user ID independently issued by the second service instead of the user ID common to the first service.

The code ID is an example of first information. Accordingly, the code ID as used herein can be read as "first information." The first information is not limited to the code ID, and may be any information that can identify the user by at least the first service. For example, the first information may be information called by another name such as "user account" instead of the information called "ID," or an email address may be used as the first information.

For example, the user ID may correspond to the first information. When the user ID corresponds to the first information, the second information described later is not required to be present, and is not required to be used at the check-in. In addition, for example, the first information may be a user ID independently issued by the first service instead of the user ID common to the second service. In this case, it is required to identify the user on the second service side, and hence the second information may be present and may be used for the check-in. The association between the first information and the second information may be managed by a second database DB2 instead of the first database DB1.

In the at least one embodiment, a procedure for membership registration of a user is common to the first service and the second service. When the user registers as a member, a user ID being information that can identify the user in both the first service and the second service is issued. For example, registration information on the user associated with the user ID is stored in a database for management different from the first database DB1 and the second database DB2. The registration information includes, for example, a password, a full name, an address, and a telephone number. The registration information may include other personal information.

After the user has completed the membership registration procedure, the user performs a procedure for setting the use of the first service. When this procedure for setting the use has been completed, a record corresponding to the user is created in the first database DB1. This record stores the user ID, the password, and the full name that are stored in the database for management.

The payment information is information relating to the payment means registered by the user. For example, the payment information includes payment source information being the payment means designated by the user as the payment source from among a plurality of payment means, the payment scheme currently selected by the user (information that can identify whether the real-time payment is selected or the lump-sum payment is selected), credit card information including, for example, a number of a credit card registered by the user, electronic money information including, for example, an ID of electronic money of the user, and electronic cash information including, for example, an ID of electronic cash of the user. The payment information may include information corresponding to the payment means. Electronic payment of a certain user is executed based on the payment information on the certain user.

The usage history is a history of electronic payment used by the user in the past. This usage history is not limited to the electronic payment used inside the stadium, but also includes electronic payment used outside the stadium. This usage history also includes electronic payment used at a place requiring no check-in. For example, the usage history includes a lump-sum payment flag, a date/time of usage, a payee, a usage amount, and item information. The usage history is updated by the electronic payment execution module 103 described later.

The lump-sum payment flag is information that can identify electronic payment being a target of the lump-sum payment. In the example of FIG. 8, the electronic payment with the lump-sum payment flag being set to "1" is a target of the lump-sum payment. The electronic payment with the lump-sum payment flag being set to "0" is not a target of the lump-sum payment but a target of the real-time payment. The date/time of usage is a date/time at which the electronic payment was used. The payee is information relating to an opposite party of the electronic payment. In the at least one embodiment, the electronic payment is executed by using the payment terminal 50 to read the code C40, and hence a terminal ID identifying the payment terminal 50 that has read the code C40 is stored as the payee.

The usage amount is a payment amount paid in the electronic payment. When the user pays the total amount of a plurality of products by one-time electronic payment, this total amount corresponds to the usage amount. The item information is information that can identify a product purchased by the electronic payment. When the user purchases a plurality of products by one-time electronic payment, the item information may indicate information that can identify all the products or may indicate information that can identify only some of the products.

The check-in information is information relating to a status of the check-in. For example, the check-in information includes a stadium at which the check-in was executed, a date/time at which the check-in was executed, and a date/time at which the check-out was executed. The information stored in the first database DB1 is not limited to the example of FIG. 8, and any information may be stored therein. For example, information for logging in to the first service without inputting a user ID and a password may be stored.

[Determination Module]

The determination module 101 determines, depending on the user, whether to execute the real-time payment to be executed for each payment request or to execute the lump-sum payment to be collectively executed for a plurality of payment requests. In the at least one embodiment, the determination module 101 determines whether to execute the real-time payment or the lump-sum payment based on selection performed by the user. A method of determining the real-time payment or the lump-sum payment is not limited to the method based on the selection performed by the user, and may be automatically selected in the electronic payment system S as described later in modification examples of the present disclosure.

Determining depending on the user refers to determining for each user whether to execute the real-time payment or the lump-sum payment. The determination module 101 determines any one of the real-time payment or the lump-sum payment as the payment scheme of the user. In the at least one embodiment, the determination module 101 determines whether to execute the real-time payment or the lump-sum payment as the payment scheme after the check-in. That is, the determination module 101 determines whether to execute the real-time payment or the lump-sum payment as the payment scheme after the check-in and before the check-out. The determination module 101 determines whether to execute the real-time payment or the lump-sum payment as the payment scheme for electronic payment to be used in a place to which the user has checked in (in the at least one embodiment, stadium).

In the at least one embodiment, the payment request is made through use of the first app installed on the user terminal 30 of the user, and hence the determination module 101 determines whether to execute the real-time payment or the lump-sum payment as the payment scheme of the payment request received through use of the first app. The first app is an example of a payment application (app). Accordingly, the first app as used herein can be read as "payment application (app)."

In the at least one embodiment, the user can visit the stadium and use a series of services at a plurality of positions, and the payment terminal 50 capable of transmitting a payment request is arranged at each of those plurality of positions. Accordingly, the determination module 101 determines the real-time payment or the lump-sum payment as the payment scheme corresponding to the payment request from the payment terminal 50 arranged at each of the plurality of positions. A payment request from the payment terminal 50 outside the stadium after the user has checked out from the stadium is not applied as the target of the lump-sum payment.

The stadium is an example of a predetermined place. Accordingly, the stadium as used herein can be read as "predetermined place." The predetermined place is a place in which electronic payment can be used at a plurality of positions in the predetermined place. The predetermined place has a certain size, and the user can move around in the predetermined place. In the predetermined place, a plurality of services may be provided. Locations in the predetermined place at which the individual services are provided correspond to the plurality of positions described above.

The predetermined place may be a place in which orders for, for example, ticket purchase and reservation do not occur. For example, this place may be a facility such as a shopping mall, a day-trip hot spring facility, an event venue, a game arcade, a department store, an airport, or a train station. In those facilities, electronic payment can be used at a plurality of positions on the premises. The user visits those facilities without particular reservation. The check-in terminal 40 similar to that of the at least one embodiment is arranged in each of those facilities, and check-in may be executed by the same procedure as that of the at least one embodiment.

[Payment Request Reception Module]

The payment request reception module 102 receives a payment request for electronic payment when the user visits the stadium to use each of a series of services. In the at least one embodiment, the payment terminal 50 reads the code C40 displayed by the first app to acquire the code ID included in the code C40, and then transmits the payment request including the code ID to the first server 10. The payment request is a request for executing electronic payment, and is performed by transmitting data having a predetermined format. The payment request includes information required for the electronic payment in addition to the code ID. For example, the payment request includes the terminal ID that can identify the payment terminal 50 and the usage amount. The payment request may include the item information.

In the at least one embodiment, the payment request reception module 102 receives payment requests from the payment terminals 50 in the stadium. Those payment requests include a payment request for real-time payment and a payment request for lump-sum payment. When the payment request for the real-time payment is received, the electronic payment is executed immediately. When the payment request for the lump-sum payment is received, the execution of the electronic payment is temporarily suspended. The suspended electronic payment is stored in the usage history of the first database DB1. In the example of FIG. 8, records of the electronic payment with the lump-sum payment flag being set to "1" in the usage history correspond to the suspended electronic payment.

The final execution of the lump-sum payment is instructed separately from the payment request for the lump-sum payment. In the at least one embodiment, a check-out execution request received from the check-in terminal 40 corresponds to an instruction for the final execution of the lump-sum payment. This instruction is not limited to the check-out execution request, and may be any instruction. For example, an instruction given by the user may be used as described later in modification examples. In addition, the final execution of the lump-sum payment may be performed in a case of satisfying a condition that, for example, a predetermined date/time has been reached, an elapsed time period since the check-in has become a predetermined time period, or the game has ended, instead of receiving some instruction.

[Electronic Payment Execution Module]

The electronic payment execution module 103 executes the electronic payment based on the payment means that can be used by the user. In the at least one embodiment, when the user checks in to the stadium, any one of the real-time payment or the lump-sum payment is determined by the determination module 101 as the payment scheme of this user, and hence the electronic payment execution module 103 executes the real-time payment or the lump-sum payment based on a result of the determination performed by the determination module 101. For example, the electronic payment execution module 103 uses the first app installed on the user terminal 30 of the user to execute the real-time payment or the lump-sum payment.

The electronic payment execution module 103 executes the electronic payment based on the payment request received by the payment request reception module 102. For example, the electronic payment execution module 103 refers to the first database DB1 to acquire the payment information associated with the code ID included in the payment request. The electronic payment execution module 103 identifies the payment scheme of the user determined by the determination module 101 (in the at least one embodiment, payment scheme selected by the user himself or herself) based on the acquired payment information.

When the payment scheme of the user is the real-time payment, the electronic payment execution module 103 executes the real-time payment each time a payment request is received after the check-in. In the at least one embodiment, the electronic payment execution module 103 executes the real-time payment each time a payment request is received after the check-in and before the check-out. The electronic payment execution module 103 executes the real-time payment each time a payment request is received from the payment terminal 50 arranged at each of the plurality of positions in the stadium.

For example, the electronic payment execution module 103 immediately executes the electronic payment of the payment request received by the payment request reception module 102 without suspension. As the method itself of executing electronic payment, a publicly known method can be used. For example, in a case of the credit card payment, a credit limit is checked against the usage amount included in the payment request, and in a case of the electronic money payment, processing for deducting the usage amount included in the payment request from the balance is executed.

The electronic payment execution module 103 transmits an execution result of the real-time payment to the user terminal 30 and the payment terminal 50. The electronic payment execution module 103 updates the usage history of the first database DB1 based on the execution result of the real-time payment. The lump-sum payment flag of this record of the usage history becomes "0." The date/time of usage, the payee, the usage amount, and the item information that are included in the usage history become the current date/time, the terminal ID of the payment terminal 50 that has transmitted the payment request, and the usage amount and the item information that are included in the payment request, respectively.

When the payment scheme of the user is the lump-sum payment, the electronic payment execution module 103 executes lump-sum payment based on the plurality of payment requests received after the check-in. In the at least one embodiment, the electronic payment execution module 103 executes the lump-sum payment based on the plurality of payment requests received after the check-in and before the check-out. The electronic payment execution module 103 executes the lump-sum payment based on the plurality of payment requests from the payment terminals 50 arranged at the plurality of positions in the stadium.

For example, the electronic payment execution module 103 suspends the electronic payment of the payment request received by the payment request reception module 102 without immediately executing the electronic payment, and updates the usage history of the first database DB1. The lump-sum payment flag of this record of the usage history becomes "1." The date/time of usage, the payee, the usage amount, and the item information that are included in the usage history become the current date/time, the terminal ID of the payment terminal 50 that has transmitted the payment request, and the usage amount and the item information that are included in the payment request, respectively. The usage history may include information that can identify whether or not the lump-sum payment has been completed.

In the at least one embodiment, when the user checks out, the electronic payment execution module 103 collectively executes the electronic payment of those plurality of payment requests at one time. The electronic payment execution module 103 executes the lump-sum payment based on a record of the usage history with the lump-sum payment flag being set to "1" among records of the usage history associated with the user ID of the user subjected to the check-out. Assuming that the usage history includes "n" records (where "n" represents a natural number), the electronic payment execution module 103 executes "n" times of electronic payment corresponding to those "n" records of the usage history one after another as the lump-sum payment based on the payment means selected as the payment source. The numerical value of "n" may be 1, and hence in this case, one-time electronic payment is executed as the lump-sum payment. As described above, the electronic payment execution module 103 may execute the one electronic payment as the lump-sum payment based on the total amount of a sum of the usage amounts of the "n" records of the usage history.

When the payment source of the user is electronic money, electronic cash, or a bank account, the balance is examined. When the lump-sum payment is executed, the electronic payment execution module 103 determines whether or not the balance of the payment means that can be used by the user is equal to or larger than the total value of the sum of the usage amounts of the plurality of payment requests. When it is determined that the balance is equal to or larger than the total amount, the electronic payment execution module 103 executes the lump-sum payment. When the balance is smaller than the total amount, the lump-sum payment is not executed. In this case, the user changes the payment source or charges the balance, and then executes the lump-sum payment again.

The electronic payment execution module 103 may also execute the electronic payment in the same manner when a payment request is received from a terminal other than the payment terminal 50. However, in the at least one embodiment, it is assumed that the real-time payment is executed as a rule as the electronic payment used outside the stadium. When the user visits a place other than the stadium and the place supports the electronic payment system S according to the at least one embodiment, the lump-sum payment may be executed as the electronic payment used at this place.

[3-2. Functions Implemented on Second Server]

As illustrated in FIG. 7, on the second server 20, a data storage unit 200, a second service providing module 201, a check-in execution module 202, and a check-out execution module 203 are implemented. The data storage unit 200 is implemented mainly by the storage unit 22. Each of the second service providing module 201, the check-in execution module 202, and the check-out execution module 203 is implemented mainly by the control unit 21.

[Data Storage Unit]

The data storage unit 200 stores data required for providing the second service to the user and data required for the check-in of the user. For example, the data storage unit 200 stores the second database DB2.

FIG. 9 is a table for showing a data storage example of the second database DB2. As shown in FIG. 9, the second database DB2 is a database in which information relating to users who have set the use of the second service is stored. For example, the second database DB2 stores a user ID, a password, a full name, order information, and check-in information.

After the user has completed the membership registration procedure, the user performs a procedure for setting the use of the second service. When this procedure for setting the use has been completed, a record corresponding to the user is created in the second database DB2. This record stores the user ID, the password, and the full name that are stored in the database for management.

The order information is information relating to contents of an order regarding the second service. In the at least one embodiment, the purchase order for a ticket corresponds to the order regarding the second service. Accordingly, the purchase order for a ticket as used herein can be read as "order regarding the second service." The order regarding the second service is an order placed from the second service or an order for using the second service. The order is not limited to the purchase order for a ticket. For example, a reservation for a facility such as an accommodation facility or a restaurant or a reservation for an airplane or a train may correspond to the order.

The order information may include contents corresponding to the second service. In the at least one embodiment, the purchase order for a ticket corresponds to the order, and hence the order information indicates the contents of the purchased ticket. For example, the order information includes a date/time at which the game is to be held, a seat in the stadium, and a price of the ticket. The check-in information is the same as that of the first database DB1. The check-in information is updated by the second server 20, and is shared with the first server 10. The information stored in the second database DB2 is not limited to the example of FIG. 9, and any information may be stored therein. For example, the code ID may be stored. The data storage unit 200 may also store data of, for example, the top page P1 and information on remaining seats for the ticket.

[Second Service Providing Module]

The second service providing module 201 provides the second service to the user. The second service providing module 201 may execute processing corresponding to the contents of the second service. In the at least one embodiment, a ticket purchase service corresponds to the second service, and hence the second service providing module 201 provides the user with, for example, a page (for example, top page P1) for receiving the purchase order for a ticket. Further, for example, the second service providing module 201 searches tickets based on a search condition input by the user. Further, for example, when the user has purchased a ticket, the second service providing module 201 generates order information, and stores the order information in the second database DB2 in association with the user ID of this user.

[Check-In Execution Module]

When the user visits the stadium, the check-in execution module 202 executes the check-in to the stadium through use of at least one of the user terminal 30 of the user or the check-in terminal 40 at the stadium. In the at least one embodiment, the check-in execution module 202 executes the check-in to the stadium based on the code ID or the user ID associated with the code ID.

The second server 20 in the at least one embodiment does not manage the code ID by itself, and hence the check-in execution module 202 executes the check-in to the stadium based on the user ID associated with the code ID. When the second server 20 manages the code ID by itself, the check-in execution module 202 executes the check-in to the stadium based on the code ID. In this case, the user ID is not used for the check-in.

Executing the check-in refers to detecting that the user has visited the stadium. Identifying the user who has visited the stadium or identifying the stadium that has been visited by the user corresponds to executing the check-in. The check-in can also be said to be confirmation of whether or not the user has the right to enter the stadium. For example, updating the check-in information of the second database DB2 corresponds to executing the check-in. Further, for example, transmitting all or a part of the order information on the user to the check-in terminal 40 at the stadium visited by the user or another terminal at the stadium corresponds to executing the check-in.

In the at least one embodiment, the check-in execution module 202 executes the check-in of a certain user based on the order information associated with the user ID of this user. The user ID of the user subjected to the check-in may be identified by the second server 20 itself, but in the at least one embodiment, the check-in execution module 202 executes the check-in based on the order information associated with the user ID received from the first server 10.

For example, when the second database DB2 includes the order information associated with the user ID received from the first server 10, the check-in execution module 202 updates the check-in information associated with this user ID. The check-in execution module 202 updates this check-in information so as to indicate that the user has already checked in to the stadium corresponding to the order information and to include the current date/time as the check-in date/time. Further, for example, the check-in execution module 202 transmits all or a part of the order information associated with this user ID to the check-in terminal 40 at the stadium visited by the user or another terminal at the stadium.

[Check-Out Execution Module]

When the user leaves the stadium, the check-out execution module 203 executes the check-out from the stadium through use of at least one of the user terminal 30, the check-in terminal 40, or another terminal at the stadium. The another terminal may be a check-out terminal prepared for the check-out, or may be a terminal such as the payment terminal 50. Those terminals have the same physical configuration and function as those of the check-in terminal 40.

The check-out execution module 203 executes the check-out in the same manner as the flow at the time of the check-in. For example, the check-in terminal 40 transmits the code ID included in the code C60 of the user terminal 30 to the first server 10. After that, the user ID associated with this code ID is transmitted from the first server 10 to the second server 20, and the check-in information on this user ID is updated, to thereby execute the check-out. As described above, in a series of steps of this flow, the lump-sum payment is executed by the electronic payment execution module 103 of the first server 10.

[3-3. Functions Implemented on User Terminal]

As illustrated in FIG. 7, on the user terminal 30, a data storage unit 300, a display control module 301, and a selection reception module 302 are implemented. The data storage unit 300 is implemented mainly by the storage unit 32. Each of the display control module 301 and the selection reception module 302 is implemented mainly by the control unit 31.

[Data Storage Unit]

The data storage unit 300 stores data required for the user to use the first service and the second service and data required for the check-in. For example, the data storage unit 300 stores the first app and the code ID. The user terminal 30 receives the code ID issued by the first server 10, and records the code ID in the data storage unit 300 of the user terminal 30 itself. When the user terminal 30 also receives the expiration time of the code ID, the user terminal 30 also records the expiration time in the data storage unit 300 of the user terminal 30 itself.

[Display Control Module]

The display control module 301 causes the display unit 35 to display the screens illustrated in each of FIG. 2, FIG. 3, and FIG. 5 based on the data received from the first server 10. For example, the display control module 301 can display a code including the code ID based on the first app for using the first service. In the at least one embodiment, the display control module 301 can display the code C40 for the first service and the code C60 for the second service.

In the at least one embodiment, a case in which the code C40 also includes the code ID is described, but the code C40 may include other information that can identify the user without including the code ID. The codes C40 and C60 may be any codes, and may be codes with an appearance changing with a lapse of time. The display control module 301 encodes the code ID stored in the data storage unit 300, and displays the codes C40 and C60.

[Selection Reception Module]

The selection reception module 302 receives selection of any one of the real-time payment or the lump-sum payment which has been performed by the user. In the at least one embodiment, the selection reception module 302 receives the selection through use of the button B44 illustrated in FIG. 5 or the buttons B70 and B71 illustrated in FIG. 3. The selection of the real-time payment or the lump-sum payment may be performed through use of any user interface, and is not limited to the example of the at least one embodiment. For example, the selection may be received through use of another type of input form such as a check box or a rolling picker. The selection reception module 302 may receive the selection through use of voice input.

[3-4. Functions Implemented on Check-In Terminal]

As illustrated in FIG. 7, on the check-in terminal 40, a data storage unit 400 and a code ID acquisition module 401 are implemented. The data storage unit 400 is implemented mainly by the storage unit 42. The code ID acquisition module 401 is implemented mainly by the control unit 41.

[Data Storage Unit]

The data storage unit 400 stores data required for the check-in. For example, the data storage unit 400 stores a terminal ID that can identify the check-in terminal 40 and information that can identify the first server 10. In addition, for example, the data storage unit 400 may store information that can identify the stadium at which the check-in terminal 40 is arranged.

[Code ID Acquisition Module]

When the user of the first service visits the stadium, the code ID acquisition module 401 acquires the code ID of the user that can identify the user in the first service through use of at least one of the user terminal 30 of the user or the check-in terminal 40 at the stadium. In the at least one embodiment, a case in which both the user terminal 30 and the check-in terminal 40 are used is described, but as described later in modification examples, only any one of the user terminal 30 or the check-in terminal 40 may be used.

In the at least one embodiment, the code ID is recorded in the data storage unit 300 of the user terminal 30, and hence the code ID acquisition module 401 acquires the code ID recorded in the user terminal 30. For example, the code ID acquisition module 401 acquires the code ID when the code C60 is read by the check-in terminal 40. The code ID acquisition module 401 transmits this code ID to the first server 10. Along with this code ID, at least one of the terminal ID or the information that can identify the stadium at which the check-in terminal 40 is arranged may be transmitted.

The code ID is not required to be optically acquired, and may be acquired by communication. It suffices that the check-in terminal 40 is a terminal for acquiring the code ID, and is a terminal that supports a method of acquiring the code ID. For example, a communication device capable of communicating to/from the user terminal 30 may correspond to the check-in terminal 40. The communication itself can use any protocol, and may be, for example, Wi-Fi (trademark), Bluetooth (trademark), or infrared communication, or may be short-range wireless communication employed by a publicly known IC card.

The stadium is an example of a place regarding the second service. Accordingly, the stadium as used herein can be read as "place regarding the second service." The place regarding the second service is a place for which an order is placed through use of the second service or a place at which the second service is provided. For example, the place regarding the second service may be another facility such as an accommodation facility, a tourist facility, a public facility, an airport, a train station, a store, a restaurant, or a beauty salon. Further, an outdoor space, a bus stop, or another such place with no particular facility may be the place regarding the second service.

[3-5. Functions Implemented on Payment Terminal]

As illustrated in FIG. 7, on the payment terminal 50, a data storage unit 500 and a code ID acquisition module 501 are implemented. The data storage unit 500 is implemented mainly by the storage unit 52. The code ID acquisition module 501 is implemented mainly by the control unit 51.

[Data Storage Unit]

The data storage unit 500 stores data required for the electronic payment. For example, the data storage unit 500 stores a terminal ID that can identify the payment terminal 50 and information that can identify the first server 10. In addition, for example, the data storage unit 500 may store information that can identify the stadium at which the payment terminal 50 is arranged.

[Code ID Acquisition Module]

The code ID acquisition module 501 acquires the code ID stored in the user terminal 30. A method of acquiring the code ID is the same as that of the code ID acquisition module 401. For example, the code ID acquisition module 501 acquires the code ID when the code C40 is read by the payment terminal 50. The code ID acquisition module 501 transmits a payment request including this code ID to the first server 10. Along with this code ID, the payment request including at least one of the terminal ID or the information that can identify the stadium at which the payment terminal 50 is arranged may be transmitted.

4. Processing to be Executed by Electronic Payment System

Figure 10:
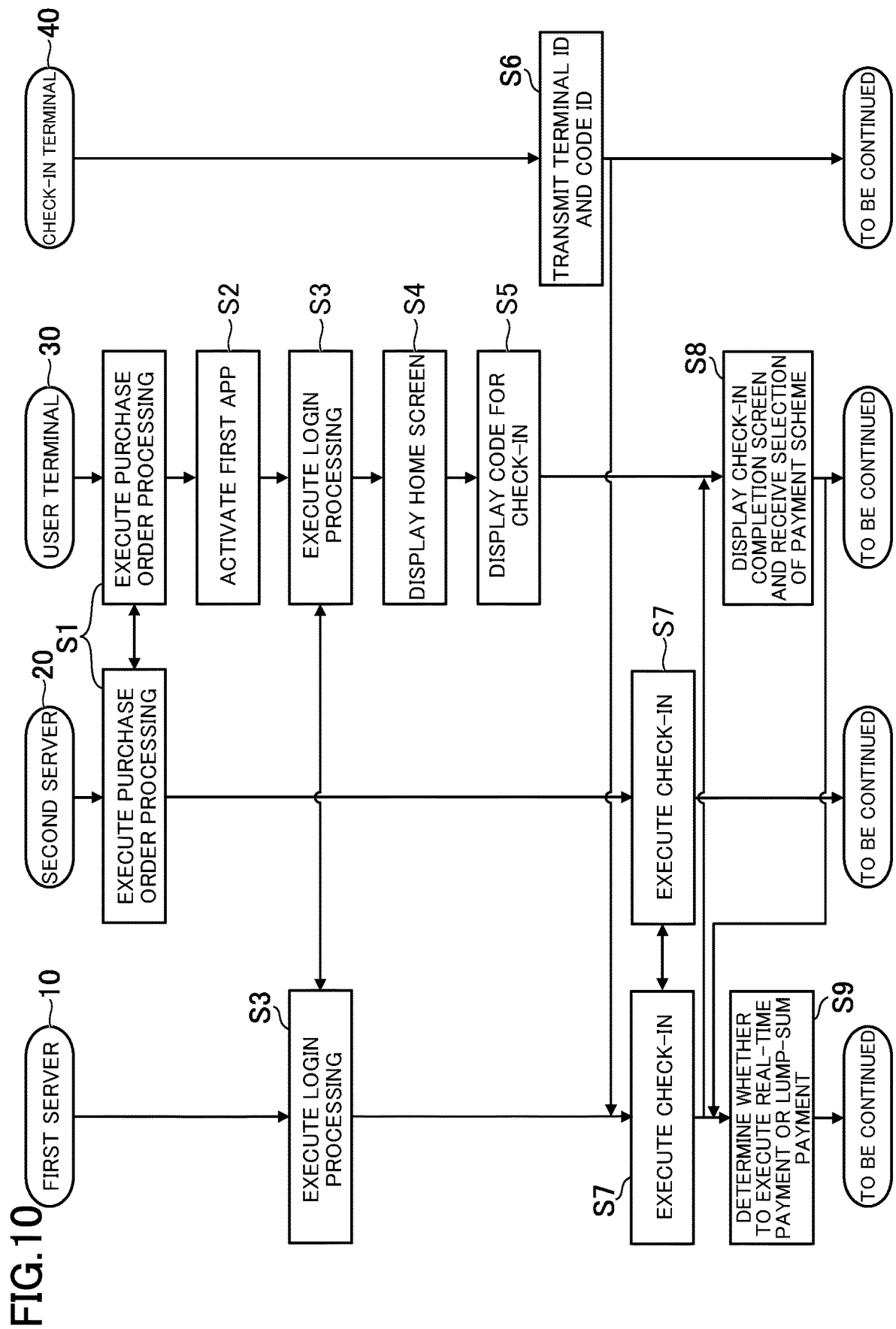
FIG. 10 is a flow chart for illustrating an example of processing to be executed by the electronic payment system.
Figure 11:
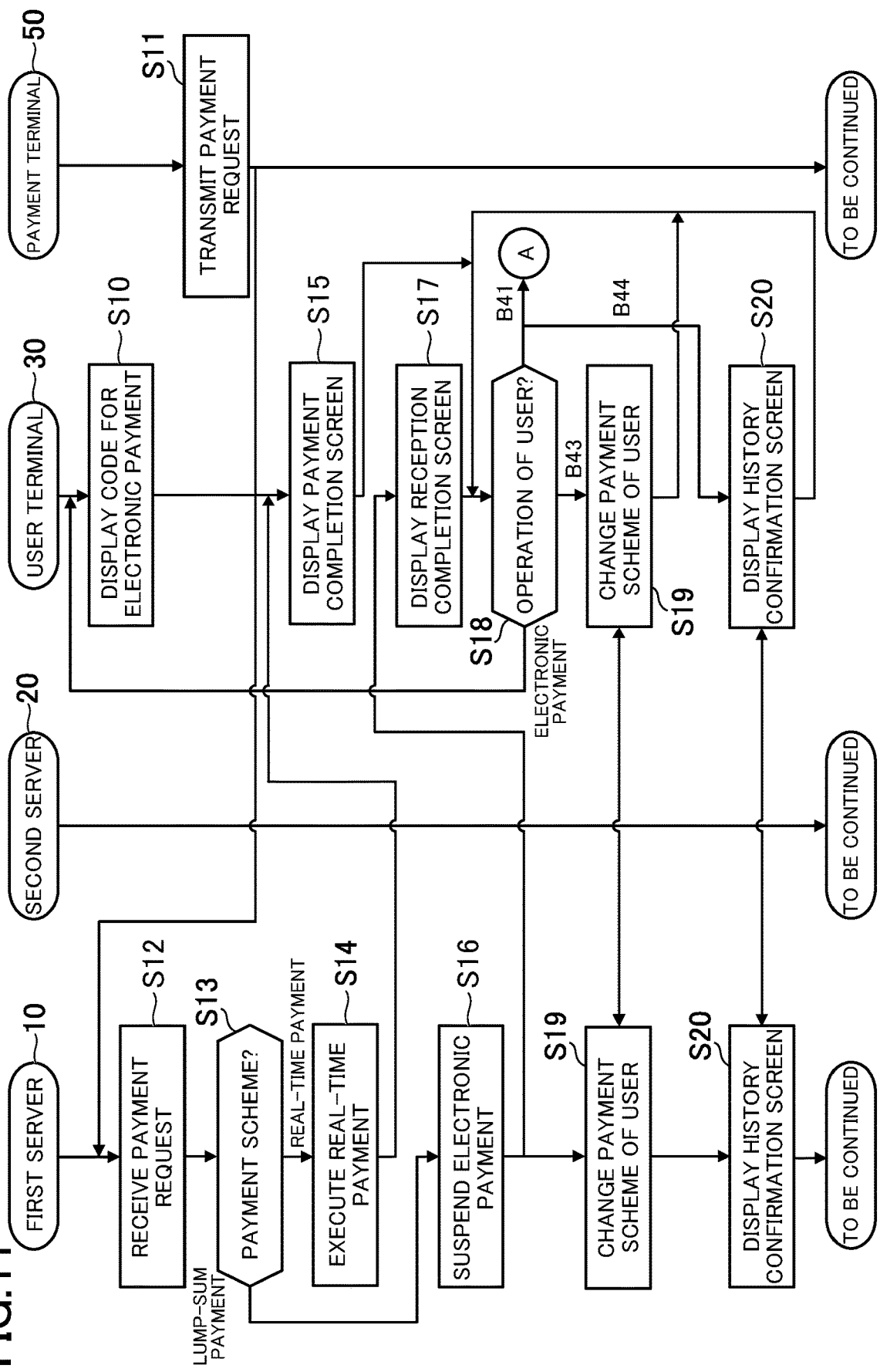
FIG. 11 is a flow chart for illustrating the example of the processing to be executed by the electronic payment system.
Figure 12:
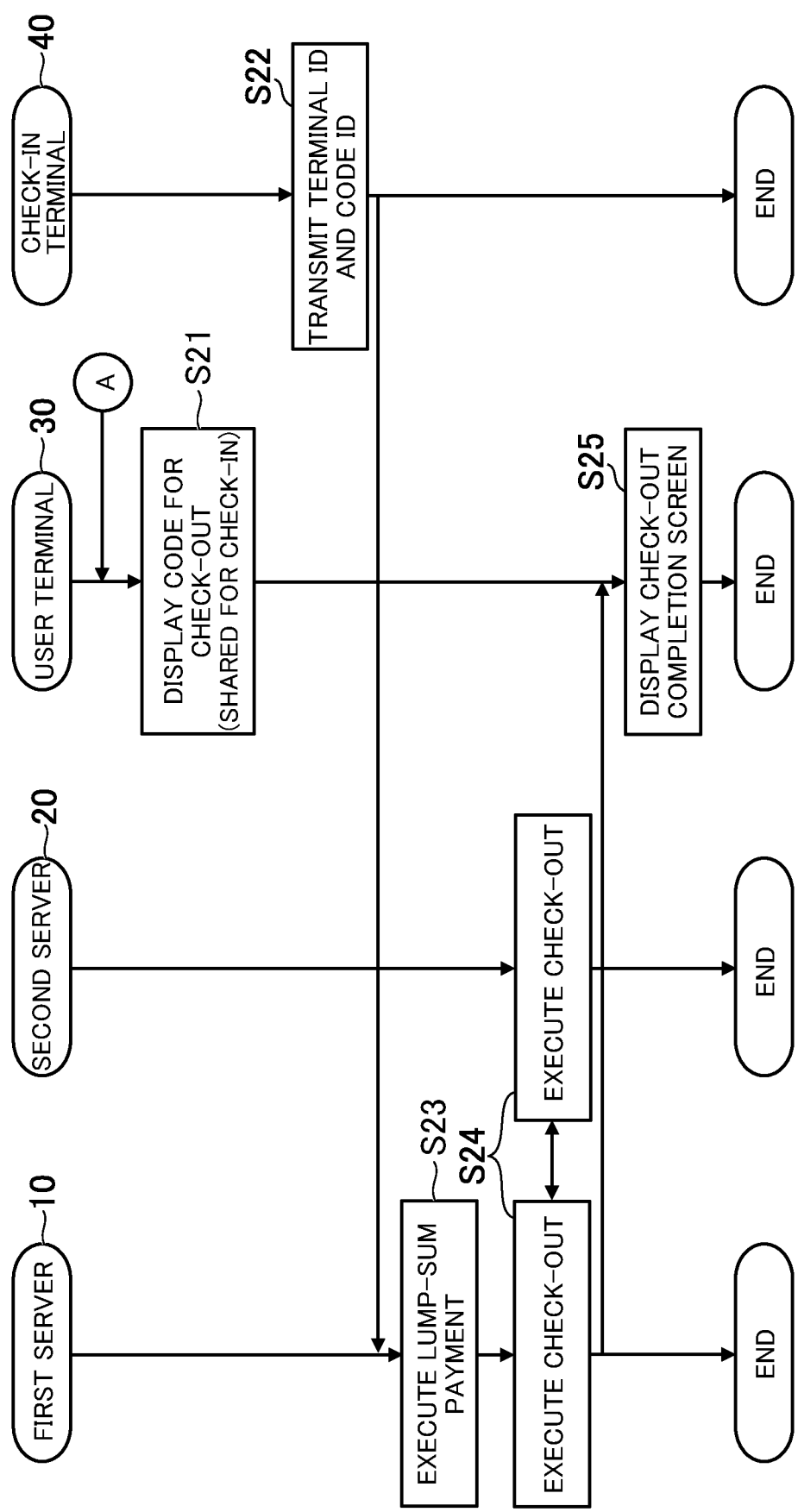
FIG. 12 is a flow chart for illustrating the example of the processing to be executed by the electronic payment system.

FIG. 10 to FIG. 12 are flow charts for illustrating an example of processing to be executed by the electronic payment system S. The processing illustrated in FIG. 10 to FIG. 12 is executed by the control units 11, 21, 31, 41, and 51 operating in accordance with the programs stored in the storage units 12, 22, 32, 42, and 52, respectively. The processing illustrated in FIG. 10 to FIG. 12 is an example of processing to be executed by the functional blocks illustrated in FIG. 7.

As illustrated in FIG. 10, ticket purchase order processing is executed between the second server 20 and the user terminal 30 (Step S1). In Step S1, a ticket is purchased in accordance with the flow described with reference to FIG. 2. The second server 20 generates order information based on the information received from the user terminal 30, and stores the order information in the second database DB2 in association with the user ID of the user who has purchased the ticket.

When the user selects the first app from the operating unit 34, the user terminal 30 activates the first app stored in the storage unit 32 (Step S2), and executes login processing in cooperation with the first server 10 (Step S3). In Step S3, the user terminal 30 transmits an execution request for the login processing to the first server 10. This execution request includes information required for the login, and in the at least one embodiment, corresponds to a request for issuance of a code ID. The first server 10 executes the login processing based on the information received from the user terminal 30 and the first database DB1. When the login is successful, the first server 10 issues a code ID and sets an expiration time so as to inhibit the code ID from overlapping with another code ID before the expiration time, and transmits the code ID to the user terminal 30. When the user terminal 30 receives the code ID, the user terminal 30 records the code ID and the expiration time in a storage area for the first app in the storage unit 32.

The user terminal 30 causes the display unit 35 to display the home screen G4 of the first app (Step S4), and when the user selects the button B41, the user terminal 30 displays the code C60 for the check-in on the display screen G6 based on the code ID recorded in the storage area for the first app (Step S5). When the user visits the stadium for which the ticket has been purchased, the user holds the code C60 of the user terminal 30 displayed in Step S5 over the check-in terminal 40. The check-in terminal 40 acquires the code ID included in the code C60 based on a result of reading the code C60 by the reading unit 46, and transmits its own terminal ID and the code ID to the first server 10 (Step S6).

When the first server 10 receives the terminal ID and the code ID, the first server 10 executes the check-in in cooperation with the second server 20 (Step S7). In Step S7, the first server 10 refers to the first database DB1 to acquire the user ID associated with the code ID received from the check-in terminal 40. The first server 10 transmits the terminal ID received from the check-in terminal 40 and the acquired user ID to the second server 20. When the second server 20 receives the terminal ID and the user ID, the second server 20 refers to the second database DB2 to execute the check-in to the stadium based on the order information on the ticket associated with this user ID. The second server 20 updates the check-in information associated with the user ID received from the first server 10. The second server 20 also transmits all or a part of the order information to the user terminal 30.

When the user terminal 30 receives all or a part of the order information, the user terminal 30 causes the display unit 35 to display the check-in completion screen G7, and receives the selection of the payment scheme performed by the user (Step S8). In Step S8, the user terminal 30 transmits information that can identify the payment scheme selected by the user to the first server 10. The first server 10 receives this information, and determines whether to execute the real-time payment or the lump-sum payment as the payment scheme of the user (Step S9). In Step S9, the first server 10 updates the first database DB1 so that the information that can identify the payment scheme selected by the user is stored in the payment information on the user.

After that, the user can enter the stadium and use electronic payment at any place. Referring now to FIG. 11, the user terminal 30 displays the code C40 for electronic payment on the home screen G4 (Step S10). The user holds the code C40 displayed in Step S10 over the payment terminal 50 when the user pays for a service at any position in the stadium. The payment terminal 50 acquires the code ID included in the code C40 based on the result of reading the code C40 by the reading unit 56, and transmits the payment request including the terminal ID and the code ID to the first server 10 (Step S11).

When the first server 10 receives the payment request (Step S12), the first server 10 refers to the payment scheme of the user stored in the first database DB1 (Step S13). In Step S13, the payment information associated with the code ID included in the payment request is referred to. When the real-time payment is selected ("real-time payment" in Step S13), the first server 10 executes the real-time payment based on the payment request received in Step S12 (Step S14). In Step S14, the first server 10 executes the real-time payment based on the payment information associated with the code ID received from the payment terminal 50. The first server 10 updates the usage history of the user based on the execution result of the real-time payment, and transmits the execution result of the real-time payment to the user terminal 30. When the user terminal 30 receives the execution result of the real-time payment from the first server 10, the user terminal 30 causes the display unit 35 to display the payment completion screen G5 (Step S15).

When lump-sum payment is selected in Step S13 ("lump-sum payment" in Step S13), the first server 10 suspends the electronic payment of the payment request received in Step S12 (Step S16). In Step S16, the first server 10 stores a record of the usage history in the first database DB1 so that the record of the usage history is added with the lump-sum payment flag being set to "1." The first server 10 transmits information indicating a processing result of the lump-sum payment to the user terminal 30. When the user terminal 30 receives the processing result of the lump-sum payment from the first server 10, the user terminal 30 causes the display unit 35 to display the reception completion screen G8 (Step S17).

The user terminal 30 identifies an operation of the user (Step S18). A case in which an operation for returning to the home screen G4 and any one of an operation for holding the code C40 for electronic payment that has been displayed over the payment terminal 50, an operation for selecting the button B41, an operation for selecting the button B43, or an operation for selecting the button B44 are performed in Step S18 is described.

When the operation for holding the code C40 for electronic payment that has been displayed over the payment terminal 50 is performed ("electronic payment" in Step S18), the same processing steps as those of the flow of from Step S10 to Step S17 are executed. The code ID may be updated each time the electronic payment is executed. The code ID may also be updated when the expiration time of the code ID is reached or the user performs an updating operation. The code ID may also be updated when the first app is finished and then activated again.

When the user selects the button B43 on the home screen G4 ("B43" in Step S18), the user terminal 30 executes processing for changing the payment scheme of the user in cooperation with the first server 10 (Step S19). In Step S19, the user terminal 30 transmits the information that can identify the payment scheme selected by the user to the first server 10. The first server 10 receives this information, and updates the first database DB1 so that the information that can identify the payment scheme selected by the user is stored in the payment information on the user.

When the user selects the button B44 on the home screen G4 ("B44" in Step S18), the user terminal 30 transmits a display request for the history confirmation screen G9 to the first server 10, and displays the history confirmation screen G9 based on the data received from the first server 10 (Step S20). When the first server 10 receives the display request, the first server 10 acquires records of the usage history associated with the user ID of the user who has made the display request based on the first database DB1, and transmits display data of the history confirmation screen G9 to the user terminal 30. This display data may have any data format as long as the display data is data for displaying some screen on the first app. For example, the display data may be HTML data.

In Step S20, the first server 10 acquires records of the usage history with the date/time of usage being later than the date/time of the check-in from among the records of the usage history associated with this user ID, and generates display data of the history confirmation screen G9. The first server 10 acquires the date/time of usage, the payee, the usage amount, and the item information that are included in records of the usage history with the lump-sum payment flag of the acquired records of the usage history being set to "0" as the information piece I90. The first server 10 acquires the date/time of usage, the payee, the usage amount, and the item information that are included in records of the usage history with the lump-sum payment flag of the acquired records of the usage history being set to "1" as the information piece I91. The first server 10 calculates the total amount of the lump-sum payment and the grand total amount, and acquires the total amount of the lump-sum payment and the grand total amount as the information piece I92. When the user terminal 30 receives the display data, the history confirmation screen G9 is displayed on the display unit 35, and then, when the operation for returning to the home screen G4 is performed, the home screen G4 is displayed, and the process returns to Step S18.

In Step S18, when the user selects the button B41 on the home screen G4 ("B41" in Step S18), the process advances to FIG. 12, and the user terminal 30 executes the check-out from the stadium in the same processing steps of Step S21, Step S22, and Step S24 as those of the flow of from Step S5 to Step S7. However, in Step S23, the first server 10 executes the lump-sum payment of the user who is about to check out based on the first database DB1 (Step S23). In Step S23, the first server 10 refers to the first database DB1 to execute the lump-sum payment based on the records of the usage history with the lump-sum payment flag being set to "1" in the usage history of this user. When the lump-sum payment and the check-out have been completed, in Step S25, data required for displaying the check-out completion screen G10 is transmitted to the user terminal 30, the check-out completion screen G10 is displayed, and this process ends. Until the check-out is executed, the processing steps of from Step S10 to Step S20 are repeated to enable the user to execute the electronic payment for a series of services used at a plurality of positions in the stadium and confirm the usage history from the history confirmation screen G9 at any time.

According to the electronic payment system S of the at least one embodiment, when a user visits a stadium to use a series of services, the electronic payment can be executed at the stadium by the payment scheme corresponding to the user by executing the real-time payment or the lump-sum payment determined depending on the user, thereby enhancing the convenience of the electronic payment to be executed at the stadium visited by the user. For example, a user who has grasped the total amount used at the stadium can select the lump-sum payment, and a user who is not particularly concerned can select the real-time payment, and hence it is possible to provide an electronic payment service with satisfactory usability for the user. In addition, by limiting the target of the lump-sum payment to the inside of the stadium, it becomes easier to grasp the total amount used at a specific place than in a case in which the target of the lump-sum payment is not limited.

Further, when the real-time payment is determined as the payment scheme of the user, the electronic payment system S executes the real-time payment each time a payment request is received after the check-in. When the lump-sum payment is determined as the payment scheme of the user, the electronic payment system S executes the lump-sum payment based on a plurality of payment requests received after the check-in. This enhances the convenience of the electronic payment to be executed after the user checks in to the stadium.

Further, when the real-time payment is determined as the payment scheme of the user, the electronic payment system S executes the real-time payment each time a payment request is received after the check-in and before the check-out. When the lump-sum payment is determined as the payment scheme of the user, the electronic payment system S executes the lump-sum payment based on a plurality of payment requests received after the check-in and before the check-out. This enhances the convenience of the electronic payment to be executed after the user checks in to the stadium and before the user checks out from the stadium.

Further, the electronic payment system S receives the selection of any one of the real-time payment or the lump-sum payment which has been performed by the user, to thereby execute the electronic payment by the payment scheme desired by the user. This enhances the convenience of the electronic payment.

Further, the electronic payment system S executes the real-time payment or the lump-sum payment based on the payment request received through use of the first app, thereby being capable of executing the real-time payment or the lump-sum payment through use of such simple means as the application installed on the user terminal 30.

Further, the electronic payment system S executes the lump-sum payment based on a plurality of payment requests received from the payment terminals 50 arranged at the plurality of positions in the stadium visited by the user, to thereby execute the lump-sum payment for collectively executing electronic payment requested at various places in the stadium. This enhances the convenience of the electronic payment.

Further, the electronic payment system S executes the lump-sum payment when it is determined that the balance of the payment means that can be used by the user is equal to or larger than the total value of the sum of the usage amounts of a plurality of payment requests, thereby being capable of reliably executing the electronic payment of the plurality of payment requests being the targets of the lump-sum payment.

Further, the electronic payment system S executes the check-in to the stadium through use of at least one of the user terminal 30 of the user or the check-in terminal 40 at the stadium when the user visits the stadium, thereby being capable of simplifying management of information required for the check-in. For example, it is conceivable that the code for the check-in of a ticket purchased by the user is transmitted by email and the user displays this code on the user terminal 30 to check in on the day of the game. However, the user is required to find the code from a large number of email messages, and the management of the information becomes complicated. In this respect, the number of pieces of information to be managed can be reduced by allowing the user to check in from the first app used daily by the user.

5. Modification Examples

The present disclosure is not limited to the at least one embodiment described above, and can be modified suitably without departing from the spirit of the present disclosure.

Figure 13:
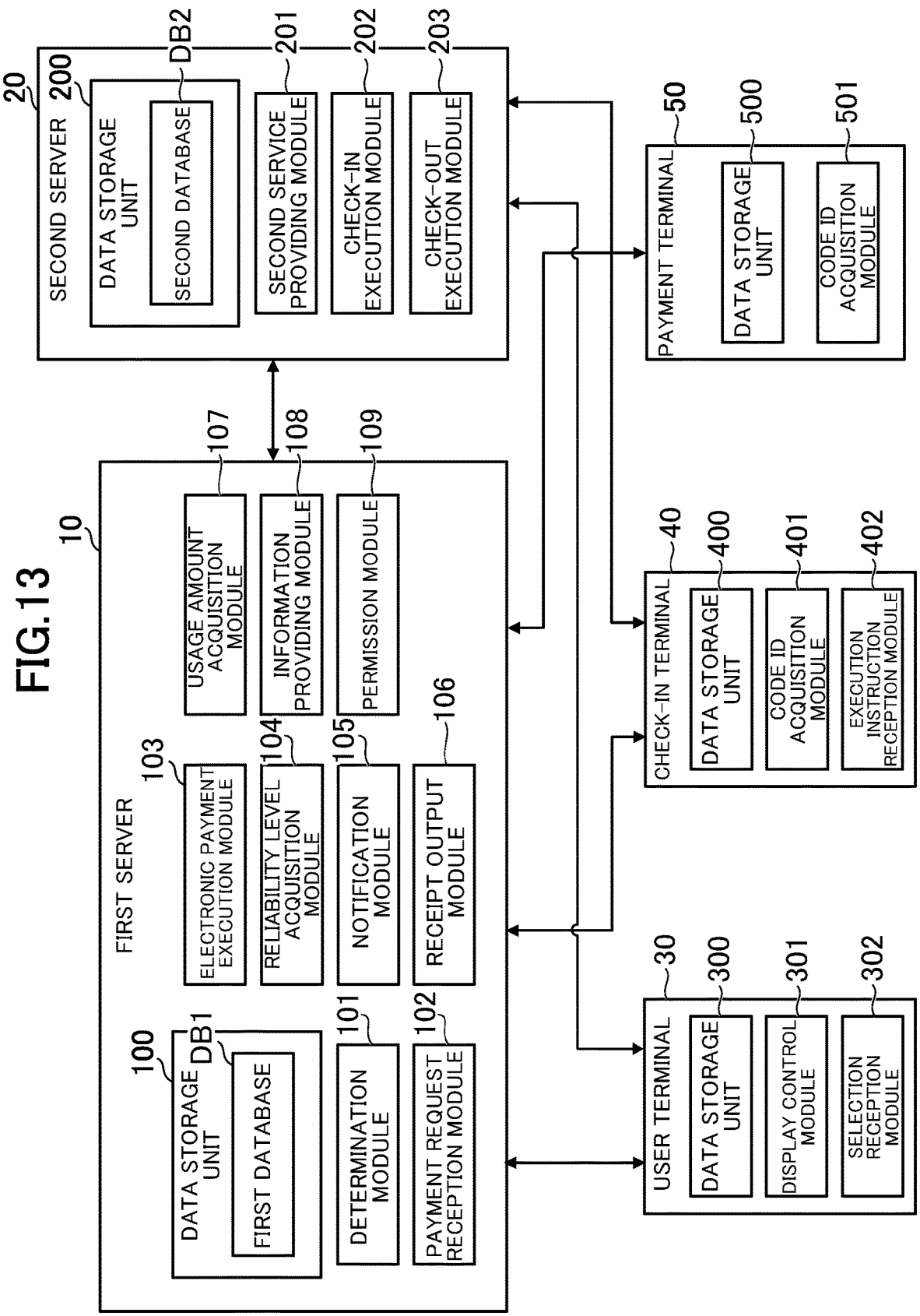
FIG. 13 is an example of a functional block diagram in modification examples of the present disclosure.

FIG. 13 is an example of a functional block diagram in the modification examples. In the modification examples described below, each of functions illustrated in FIG. 13 is implemented. Each of a reliability level acquisition module 104, a notification module 105, a receipt output module 106, a usage amount acquisition module 107, an information providing module 108, and a permission module 109 is implemented mainly by the control unit 11. An execution instruction reception module 402 is implemented mainly by the control unit 41.

[5-1. Modification Example 1]

For example, the electronic payment system S may further include the reliability level acquisition module 104 for acquiring a reliability level of a user in electronic payment. The reliability level is an index indicating reliability of the user in the electronic payment. As the probability that the electronic payment may be completed normally becomes higher, the reliability level becomes higher. For example, in the case of the credit card payment, the reliability level acquisition module 104 acquires the reliability level of the user held by a credit card company. This reliability level is so-called credibility information. Credibility information held by another payment service provider of, for example, electronic money may be acquired as the reliability level. A malicious user may commit a fraud, and hence the user may be more liable to commit a fraud as the reliability level becomes lower. The reliability level can also be said to be a degree of not committing a fraud.

Further, for example, the reliability level acquisition module 104 may calculate the reliability level of the user based on the usage history of the user stored in the first database DB1. In Modification Example 1 of the present disclosure, it is assumed that the usage history also includes an incomplete payment request (payment request that has become an error). The incomplete payment request is a payment request for which electronic payment failed to be completed. For example, in the case of the credit card payment, the payment request becomes incomplete when a credit limit error occurs. Further, for example, in the case of the electronic money payment, electronic cash payment, or payment using a bank account, the payment request becomes incomplete when the balance is insufficient. In addition, for example, in a case of payment means having a blacklist, the payment request becomes incomplete when the user is blacklisted for some reason.

For example, the reliability level acquisition module 104 calculates the reliability level of the user so that the reliability level becomes higher as the number of incomplete payment requests in the past becomes smaller. As a method itself of calculating the reliability level, various publicly known methods can be used, and for example, a method using a learning model of machine learning may be used. In this learning model, training data indicating a relationship between various feature amounts of a user (for example, usage amount, usage place, and usage time of the user) and information indicating whether or not this user can be trusted has been learned. The reliability level acquisition module 104 may input the feature amounts of the user for which the reliability level is to be calculated into the learning model to acquire the reliability level output from the learning model. This reliability level is the reliability level estimated by the learning model.

The determination module 101 determines whether to execute the real-time payment or the lump-sum payment based on the reliability level acquired by the reliability level acquisition module 104. For example, when the reliability level of a certain user is lower than a threshold value, the determination module 101 determines the real-time payment as the payment scheme of this user without permitting the user to use the lump-sum payment. In this case, the user cannot select the lump-sum payment, and can only select the real-time payment. That is, the real-time payment is forcibly determined.

When the reliability level of a certain user is equal to or higher than the threshold value, the determination module 101 permits this user to use the lump-sum payment. In this case, the determination module 101 determines, as the payment scheme of this user, the real-time payment or the lump-sum payment that has been selected by the user. The user can select any one of the real-time payment or the lump-sum payment that suits his or her preference. When the reliability level of a certain user is equal to or higher than the threshold value, the payment scheme of this user may be forced to be the lump-sum payment.

According to Modification Example 1, it is determined whether to execute the real-time payment or the lump-sum payment based on the reliability level of the user, thereby easily preventing the electronic payment from becoming incomplete. For example, the total amount of the lump-sum payment tends to become larger, and hence, when a user having a lower reliability level attempts to execute the lump-sum payment, the probability that the lump-sum payment may become incomplete becomes higher. The user having a low reliability level is required to use the real-time payment, which is assumed to be executed for a relatively small amount, thereby easily preventing the electronic payment from becoming incomplete. A user having a high reliability level is highly likely to complete the lump-sum payment even for a somewhat large amount, and hence the user is allowed to use the lump-sum payment being highly convenient. In the case in which the lump-sum payment is executed at the time of the check-out as in the at least one embodiment, the user is required to select other payment means or charge the balance on the spot when the electronic payment has become incomplete, and smooth check-out can become impossible, but when the payment scheme by which the electronic payment is likely to be completed is used, smooth check-out becomes possible. As a result, it is possible to alleviate congestion at, for example, the entrance of the stadium. In addition, for example, it is possible to prevent an untrusted user from breaking through the entrance of the stadium without completing the lump-sum payment.

[5-2. Modification Example 2]

Figure 14:
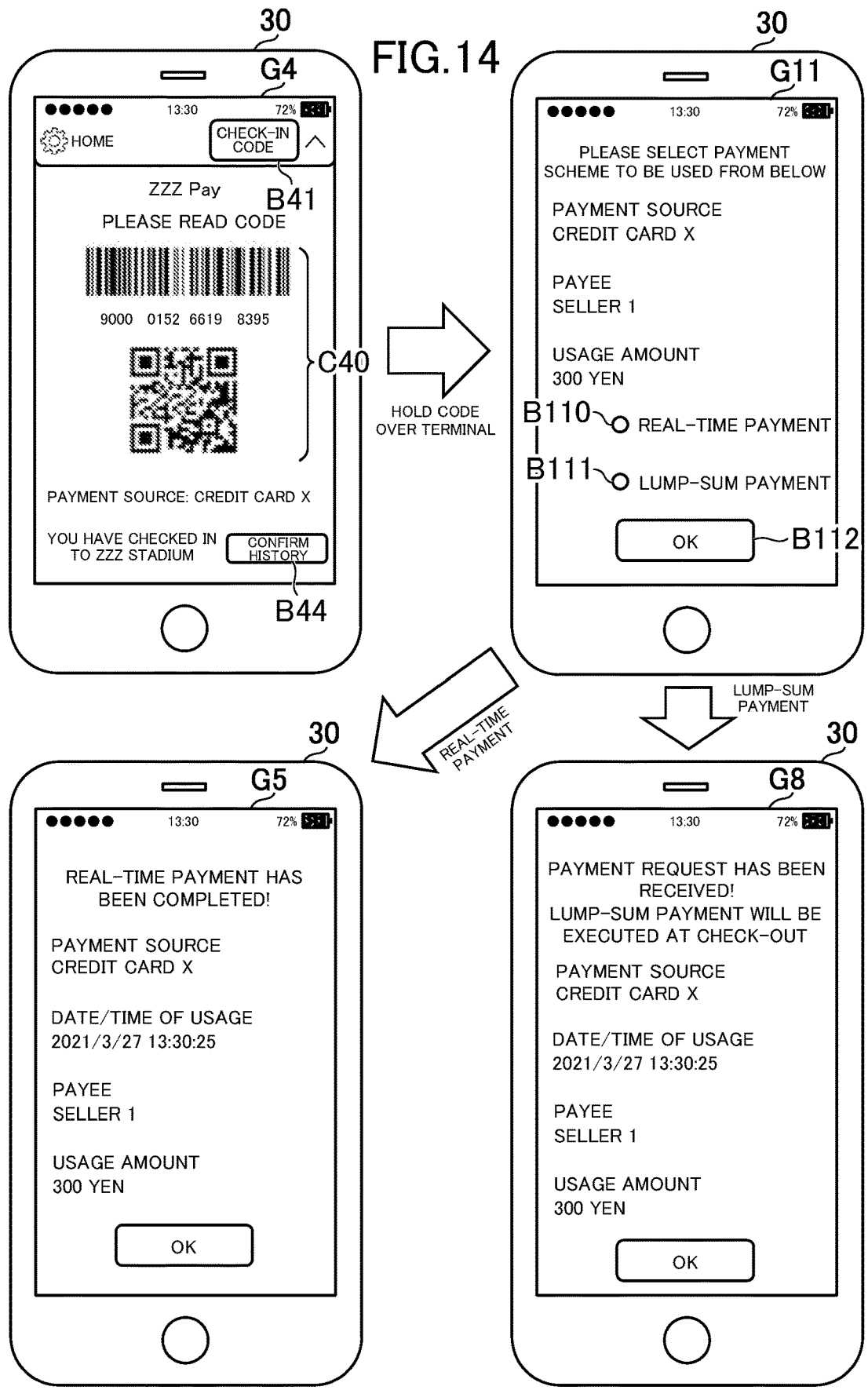
FIG. 14 is a view for illustrating an example of an electronic payment system according to Modification Example 2 of the present disclosure.

FIG. 14 is a view for illustrating an example of the electronic payment system S according to Modification Example 2 of the present disclosure. The determination module 101 in Modification Example 2 determines whether to execute the real-time payment or the lump-sum payment each time a payment request is received. As illustrated in FIG. 14, a selection screen G11 for selecting any one of the real-time payment or the lump-sum payment is displayed each time the user holds the code C40 over the payment terminal 50 instead of the user selecting the real-time payment or the lump-sum payment at the time of the check-in.

The user can select the real-time payment by selecting a button B110. The user can select the lump-sum payment by selecting a button B111. Each time a payment request is received, the determination module 101 determines whether to execute the real-time payment or the lump-sum payment based on a result of the selection on the selection screen G11. Accordingly, in Modification Example 1, it is not required to store the information that can identify the payment scheme of the user in the first database DB1.

The selection reception module 302 in Modification Example 2 receives the selection of the button B110 or the button B111 which has been performed by the user. As a method itself of selecting the payment scheme by the user, any method can be used as described in the at least one embodiment. When the user selects a button B112 after selecting any one of the button B110 or the button B111, the selection reception module 302 transmits the result of the selection performed by the user to the first server 10.

When the first server 10 receives the result of the selection performed by the user, the electronic payment execution module 103 excludes the payment request for which the real-time payment has been executed from the targets of the lump-sum payment, and executes the lump-sum payment based on the plurality of payment requests for which the real-time payment has not been executed. As described in the at least one embodiment, when the first server 10 receives the payment request from the payment terminal 50, the electronic payment execution module 103 suspends the payment request until the result of the selection performed by the user is received.

When the electronic payment execution module 103 receives the result of the selection performed by the user, the electronic payment execution module 103 executes processing corresponding to this result of the selection. For example, when the electronic payment execution module 103 receives a selection result indicating that the user has selected the real-time payment, the electronic payment execution module 103 executes the real-time payment by the flow described in the at least one embodiment in response to the reception of this selection result. As illustrated in FIG. 14, on the user terminal 30, the payment completion screen G5 indicating that the real-time payment has been completed is displayed. This payment completion screen G5 is the same as that of FIG. 5.

Further, for example, when the electronic payment execution module 103 receives a selection result indicating that the user has selected the lump-sum payment, the electronic payment execution module 103 may suspend the execution of the electronic payment by the flow described in the at least one embodiment in response to the reception of this selection result. As illustrated in FIG. 14, on the user terminal 30, the reception completion screen G8 indicating that the payment request has been received and the electronic payment has been suspended is displayed. This reception completion screen G8 is the same as that of FIG. 5.

According to Modification Example 2, it is determined whether to execute the real-time payment or the lump-sum payment each time a payment request is received, thereby enhancing the convenience of the user in the electronic payment. For example, the user can combine receipts for food and drink at the stadium into one by setting only food and drink charges at the stadium as the targets of the lump-sum payment. In this case, a receipt for the lump-sum payment can be output from the first app.

[5-3. Modification Example 3]

Figure 15:
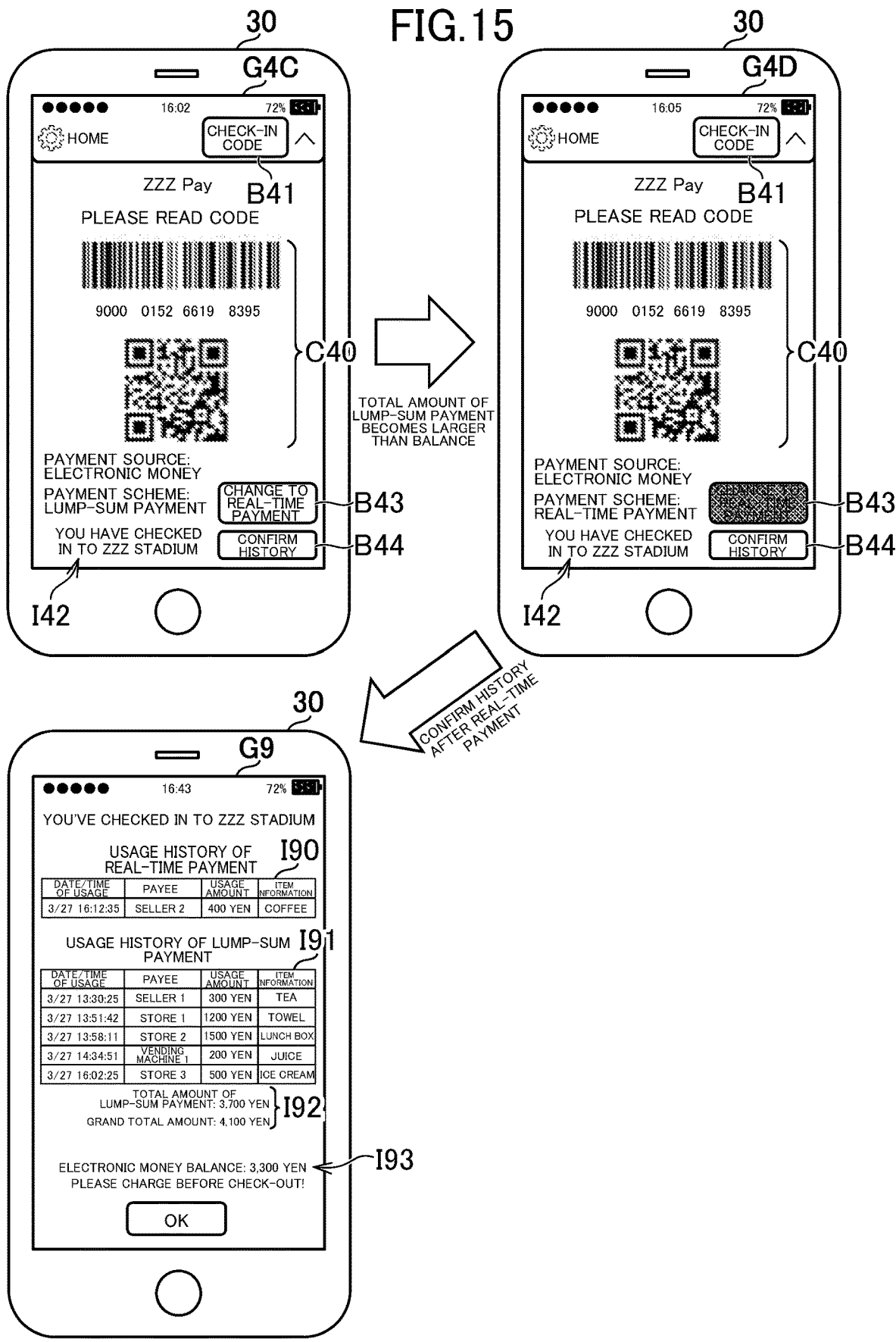
FIG. 15 is a view for illustrating an example of an electronic payment system according to Modification Example 3 of the present disclosure.

FIG. 15 is a view for illustrating an example of the electronic payment system S according to Modification Example 3 of the present disclosure. In the example of FIG. 15, the electronic money is selected as the payment source of the first app, and the lump-sum payment is selected as the payment scheme of the user (state of a home screen G4C). As described in Modification Example 1, when the total amount of the lump-sum payment becomes larger, there is a fear that the balance of the electronic money may become insufficient at the time of the check-out and the check-out may not be smooth. In view of this, in Modification Example 3, the payment scheme is automatically changed to the real-time payment when the total amount of the lump-sum payment becomes larger.

When it is determined that the lump-sum payment is to be executed, the determination module 101 in Modification Example 3 determines whether or not the total amount of the sum of the usage amounts of the plurality of payment requests is equal to or larger than a threshold value. This total amount is the total amount of the usage amounts with the lump-sum payment flag being set to "1" in the usage history of the user. This threshold value may be a fixed value or a variable value. When the threshold value is a variable value, the threshold value may be a threshold value corresponding to the balance of the electronic money. In this case, the balance of the electronic money may be used as the threshold value as it is, or an amount larger or smaller than the balance of the electronic money may be used as the threshold value. In addition, for example, the threshold value may be a threshold value corresponding to the reliability level described in Modification Example 1.

When it is determined that the total amount is equal to or larger than the threshold value, the determination module 101 changes the payment scheme from the lump-sum payment to the real-time payment. As illustrated in FIG. 15, the real-time payment is automatically selected as the payment scheme of the user each time (state of a home screen G4D). In this case, the button B43 may be grayed out or erased so as to inhibit the user to instruct the change of the payment scheme. The payment scheme of the user stored in the first database DB1 is changed to the real-time payment by the determination module 101.

After the payment scheme is changed from the lump-sum payment to the real-time payment, the electronic payment execution module 103 executes the real-time payment each time a payment request is received. A method of executing the real-time payment is as described in the at least one embodiment. As illustrated in FIG. 15, when the user selects the button B44 and the history confirmation screen G9 is displayed, an information piece I93 including the balance of the electronic money and a message for encouraging the user to charge the electronic money before the check-out may be displayed. The balance of the electronic money may be displayed on the home screens G4C and G4D.

In the example of FIG. 15, the total amount of the lump-sum payment becomes equal to or larger than the threshold value (for example, 3,301 yen, which is 1 yen higher than 3,300 yen of the balance of the electronic money) due to the payment request from the payment terminal 50 of a store 3 at "3/27 16:02:25" indicated by the information piece I91, and hence the payment scheme has been changed from the lump-sum payment to the real-time payment. The payment request from the payment terminal 50 of a seller 2 at "3/27 16:12:35" indicated by the information piece I90 is processed as the real-time payment. As indicated by the information piece I93, the user cannot execute the lump-sum payment as it is, and hence the user is encouraged to charge the electronic money through use of, for example, the first app. In the example of FIG. 15, the payment request from the payment terminal 50 of the store 3 at "3/27 16:02:25" may be changed to the real-time payment before being processed as the lump-sum payment. In this case, the payment scheme is changed from the lump-sum payment to the real-time payment before the total amount of the lump-sum payment exceeds the balance of the electronic money.

According to Modification Example 3, when it is determined that the total amount of the lump-sum payment is equal to or larger than the threshold value, the payment scheme is changed from the lump-sum payment to the real-time payment, and hence the lump-sum payment is less likely to become incomplete.

[5-4. Modification Example 4]

Figure 16:
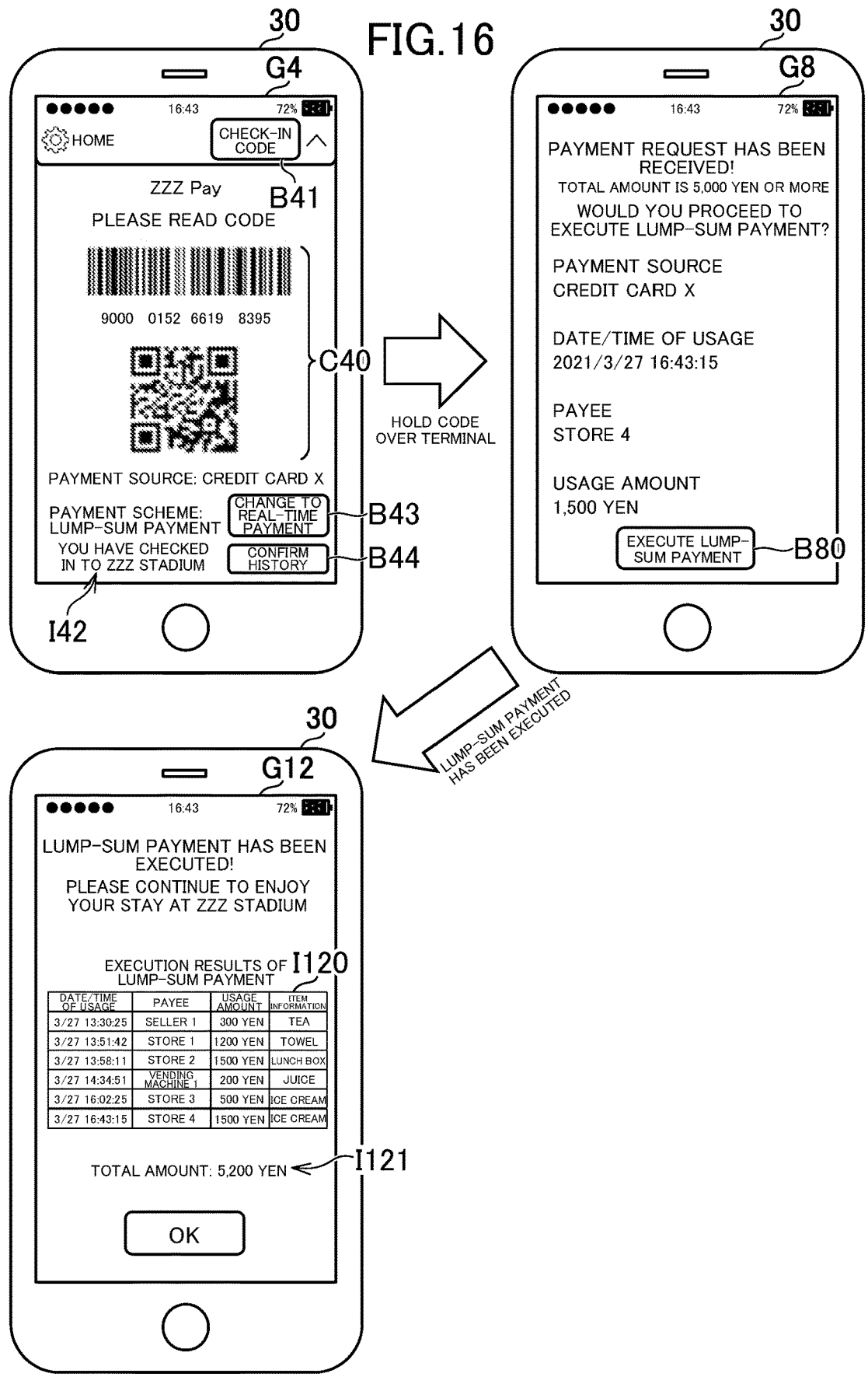
FIG. 16 is a view for illustrating an example of an electronic payment system according to Modification Example 4 of the present disclosure.

FIG. 16 is a view for illustrating an example of the electronic payment system S according to Modification Example 4 of the present disclosure. In the at least one embodiment, the case in which the lump-sum payment is executed at the time of the check-out has been described, but in Modification Example 4, it is assumed that the user can instruct the lump-sum payment while the user is in the stadium. When the execution of the lump-sum payment is instructed even while the user is in the stadium, the lump-sum payment is executed. The lump-sum payment may be instructed to be executed at any time, but in Modification Example 4, when the total amount of the lump-sum payment becomes equal to or larger than a threshold value, the lump-sum payment can be instructed in the stadium.

When it is determined that the lump-sum payment is to be executed, the electronic payment execution module 103 in Modification Example 4 determines whether or not the total amount of the sum of the usage amounts of the plurality of payment requests (total amount of the lump-sum payment) is equal to or larger than the threshold value. As illustrated in FIG. 16, this determination is executed when the user holds the code C40 of the home screen G4 over the payment terminal 50. This threshold value may be the same value as that of Modification Example 3, or may be a different value. The electronic payment execution module 103 executes the lump-sum payment when it is determined that the total amount is equal to or larger than this threshold value. The flow in this case is as described in the at least one embodiment, and the reception completion screen G8 illustrated in FIG. 8 is displayed.

When it is determined that the total amount of the lump-sum payment is smaller than the threshold value, the electronic payment execution module 103 restricts the execution of the lump-sum payment. This restriction may mean that the lump-sum payment is not to be executed, or may mean that the flow is to become different from the normal flow of the lump-sum payment. For example, as illustrated in FIG. 16, the electronic payment execution module 103 transmits data for displaying a message for confirming that the lump-sum payment is to be executed once before the check-out on the reception completion screen G8 to the user terminal 30. The reception completion screen G8 of FIG. 16 is displayed on the user terminal 30. When the user does not select a button B80 of FIG. 16, the payment request displayed on the reception completion screen G8 is excluded from the targets of the lump-sum payment. That is, this payment request is canceled.

When the user selects the button B80 of FIG. 16, the electronic payment execution module 103 executes the lump-sum payment, and a payment completion screen G12 for the lump-sum payment is displayed on the user terminal 30. This lump-sum payment differs from that in the at least one embodiment only in that the lump-sum payment is executed before the check-out, and a method itself of executing the lump-sum payment is as described in the at least one embodiment. On the payment completion screen G12, an information piece 1120 indicating details of the executed lump-sum payment and an information piece 1121 indicating the total amount of the executed lump-sum payment are displayed. The user has not checked out yet, and thus can continue to use the services at the stadium. When the user uses the lump-sum payment, the payment request for the lump-sum payment is suspended again from the beginning.

According to Modification Example 4, the lump-sum payment is executed when it is determined that the total amount of the lump-sum payment is equal to or larger than the threshold value, to thereby execute the lump-sum payment frequently to some extent, and hence the lump-sum payment is less likely to become incomplete. The lump-sum payment is executed frequently, thereby being capable of preventing the total amount of the lump-sum payment at the time of the check-out from becoming too large.

[5-5. Modification Example 5]

For example, the determination module 101 may determine whether to execute the real-time payment or the lump-sum payment based on the balance of the payment means that can be used by the user. This payment means is payment means involving the concept of the balance, and is, for example, payment means using the electronic money, the electronic cash, or the bank account. The balance of the payment means may be stored in the first database DB1 or may be acquired by inquiring of the payment service provider managing the payment means.

The determination module 101 determines whether or not the balance of the payment means selected as the payment source is equal to or larger than a threshold value. This threshold value may be a fixed value or a variable value. When the threshold value is a variable value, the threshold value may be determined based on the past usage history of the user. For example, as an average usage amount in the past usage history of the user becomes higher, the threshold value becomes larger. When the balance is lower than the threshold value, the determination module 101 determines the real-time payment as the payment scheme of this user without permitting the user to use the lump-sum payment. In this case, the user cannot select the lump-sum payment, and can only select the real-time payment. That is, the real-time payment is forcibly determined.

When the balance is equal to or larger than the threshold value, the determination module 101 permits this user to use the lump-sum payment. In this case, the determination module 101 determines, as the payment scheme of this user, the real-time payment or the lump-sum payment that has been selected by the user. The user can select any one of the real-time payment or the lump-sum payment that suits his or her preference. When the balance of a certain user is equal to or larger than the threshold value, the payment scheme of this user may be forced to be the lump-sum payment.

According to Modification Example 5 of the present disclosure, it is determined whether to execute the real-time payment or the lump-sum payment based on the balance of the payment means that can be used by the user, thereby easily preventing the electronic payment from becoming incomplete. For example, the lump-sum payment tends to have a larger amount, and hence, when a user having a smaller balance of payment means attempts to execute the lump-sum payment, the probability that the lump-sum payment may become incomplete becomes higher. The user having a small balance is required to use the real-time payment, which is assumed to be executed for a relatively small usage amount, thereby easily preventing the electronic payment from becoming incomplete. A user having a large balance is highly likely to complete the lump-sum payment even for a somewhat large amount, and hence the user is allowed to use the lump-sum payment being highly convenient. As a result, for the same reason as in Modification Example 1, smooth check-out becomes possible, and it is possible to alleviate congestion at, for example, the entrance of the stadium.

[5-6. Modification Example 6]

For example, the determination module 101 determines which one of the real-time payment or the lump-sum payment is to be executed based on, among a plurality of payment means usable to the user, payment means which has been selected by the user. For example, in the electronic money or the electronic cash, an upper limit of the balance is often set, and the electronic payment relatively tends to become incomplete. Meanwhile, a credit line of the credit card payment and the balance of the bank account often have more margin than the balance of the electronic money or the electronic cash, and hence the electronic payment is relatively less likely to become incomplete.

In view of this, when the payment means of the payment source of a user is the electronic money or the electronic cash, the determination module 101 determines the real-time payment as the payment scheme of this user without permitting the user to use the lump-sum payment. In this case, the user cannot select lump-sum payment, and can only select the real-time payment. That is, the real-time payment is forcibly determined. When the payment means is the electronic money or the electronic cash that can support auto-charging, the electronic payment is relatively less likely to become incomplete, and hence the lump-sum payment may be permitted.

When the payment means of the payment source of a user is the credit card or the bank account, the determination module 101 permits this user to use the lump-sum payment. In this case, the determination module 101 determines, as the payment scheme of this user, the real-time payment or the lump-sum payment that has been selected by the user. The user can select any one of the real-time payment or the lump-sum payment that suits his or her preference. When the payment means of the payment source of the user is the credit card or the bank account, the payment scheme of this user may be forced to be the lump-sum payment.

A relationship between the payment means and the payment scheme of the user is not limited to the above-mentioned example. It suffices that a type of payment means for which only the real-time payment is permitted and a type of payment means for which not only the real-time payment but also the lump-sum payment is permitted are defined in the data storage unit 100. The determination module 101 may identify the payment scheme permitted to the user based on the above-mentioned definition.

According to Modification Example 6 of the present disclosure, it is determined whether to execute the real-time payment or the lump-sum payment based on the payment means selected by the user from among a plurality of payment means that can be used by the user, thereby easily preventing the electronic payment from becoming incomplete. For example, the lump-sum payment tends to have a larger amount, and hence, when the execution of the lump-sum payment is attempted by the electronic money or the electronic cash, which tends to have a small balance, the probability that the lump-sum payment may become incomplete becomes higher. Accordingly, when the electronic money or the electronic cash is selected as the payment source, the user is required to use the real-time payment, which is assumed to be executed for a relatively small usage amount, thereby easily preventing the electronic payment from becoming incomplete. When the credit card or the bank account, by which the electronic payment is less likely to become incomplete, is selected as the payment source, the user is highly likely to complete the lump-sum payment even for a somewhat large amount, and hence the user is allowed to use the lump-sum payment being highly convenient. As a result, for the same reason as in Modification Example 1 and Modification Example 5, smooth check-out becomes possible, and it is possible to alleviate congestion at, for example, the entrance of the stadium.

[5-7. Modification Example 7]

Figure 17:
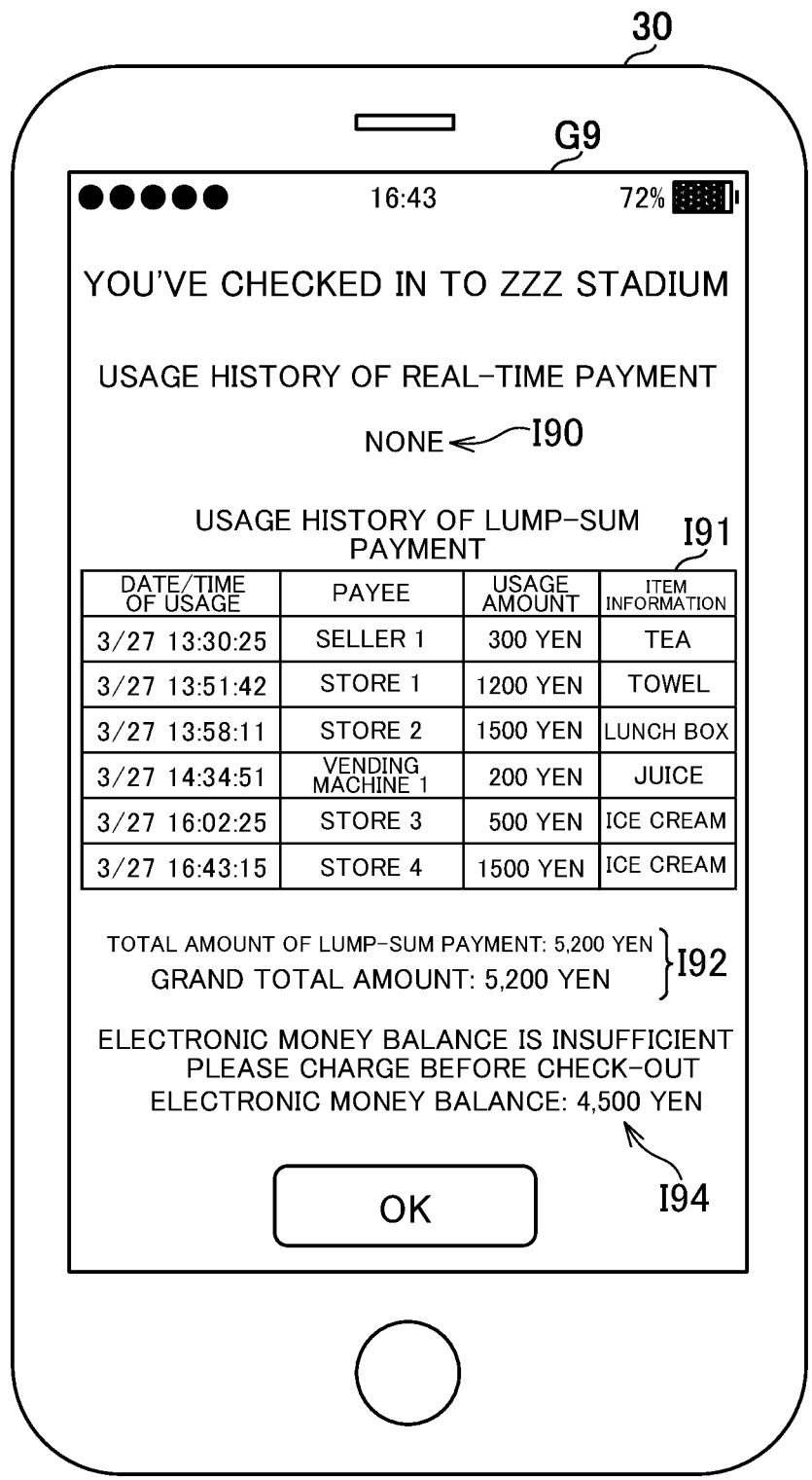
FIG. 17 is a view for illustrating an example of a history confirmation screen in Modification Example 7 of the present disclosure.

FIG. 17 is a view for illustrating an example of the history confirmation screen G9 in Modification Example 7 of the present disclosure. As illustrated in FIG. 17, on the history confirmation screen G9 in Modification Example 7, an information piece I94 indicating an alert is displayed when the total amount of the lump-sum payment becomes larger.

The electronic payment system S according to Modification Example 7 further includes the execution instruction reception module 402 for receiving an execution instruction for the lump-sum payment which has been performed by the user. When the lump-sum payment is executed at the time of the check-out as in the at least one embodiment, the execution instruction reception module 402 receives an instruction for the check-out which has been performed by the user. Examples of this instruction itself include the operation of holding the code C40 over the check-in terminal 40, as described in the at least one embodiment. The execution instruction for the lump-sum payment may be performed from the user terminal 30. In this case, the execution instruction reception module 402 is implemented on the user terminal 30.

The electronic payment execution module 103 executes the lump-sum payment when an execution instruction is received. The execution instruction triggers the lump-sum payment. The method itself of executing the lump-sum payment is as described in the at least one embodiment. The electronic payment system S according to Modification Example 7 includes the notification module 105 for providing a predetermined notification to the user when it is determined that the balance is smaller than the total amount before the execution instruction is received. In the example of FIG. 17, the notification module 105 generates display data of the history confirmation screen G9 including the information piece I94, and transmits the display data to the user terminal 30, to thereby provide the notification. The notification may be provided by any method, and is not limited to a visual method using an image. For example, an audible notification may be provided through use of sound, or a tactile notification may be provided through use of vibration of the user terminal 30.

According to Modification Example 7, when it is determined that the balance is smaller than the total amount before the execution instruction for the lump-sum payment is received, a predetermined notification is provided to the user, thereby easily preventing the electronic payment from becoming incomplete.

[5-8. Modification Example 8]

Figure 18:
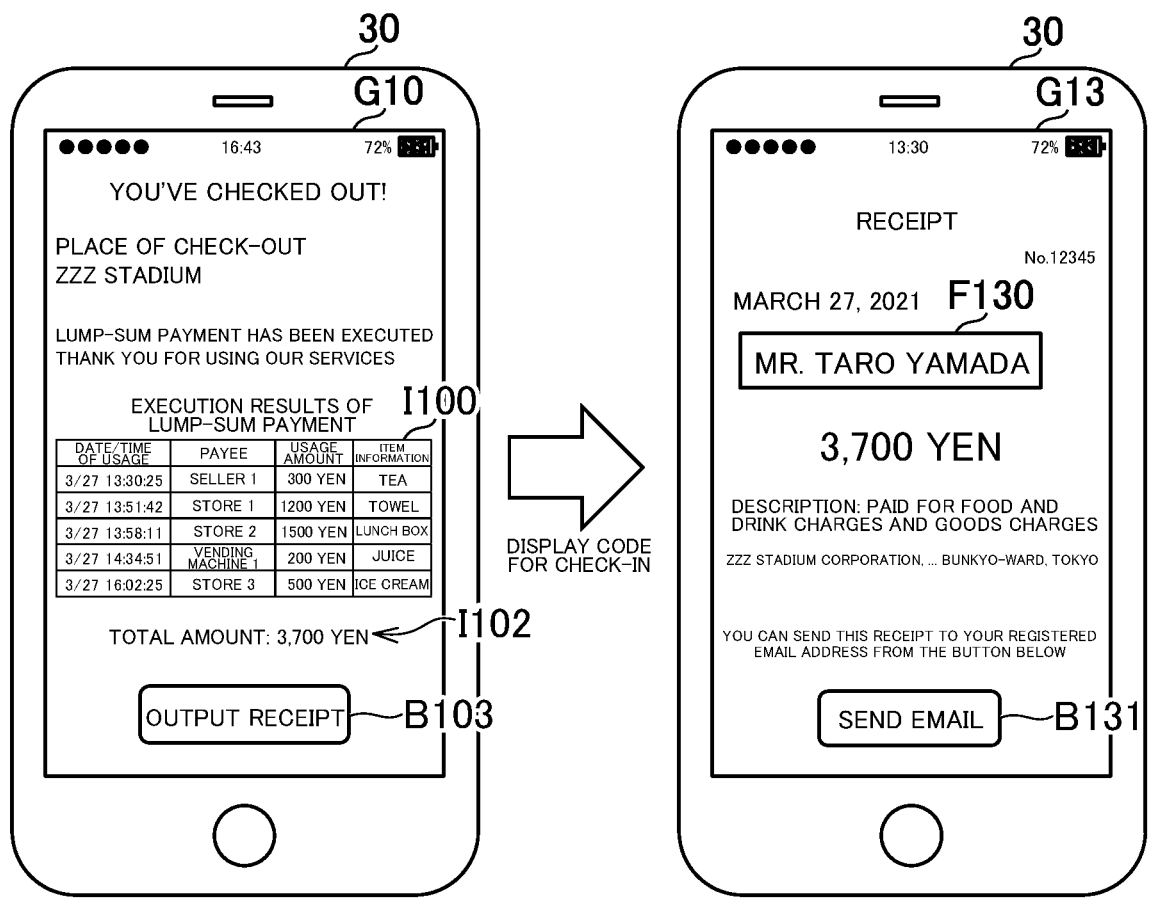
FIG. 18 is a view for illustrating an example of a check-out screen in Modification Example 8 of the present disclosure.

FIG. 18 is a view for illustrating an example of the check-out completion screen G10 in Modification Example 8 of the present disclosure. The electronic payment system S according to Modification Example 8 may include the receipt output module 106 for outputting a receipt for the total amount of the lump-sum payment when the lump-sum payment is executed by the electronic payment execution module 103. For example, when the user selects a button B103 on the check-out completion screen G10, a request for outputting a receipt for the lump-sum payment is transmitted from the user terminal 30 to the first server 10. When the first server 10 receives this information, the receipt output module 106 generates a receipt.

It is assumed that data of a format of a receipt is stored in advance in the data storage unit 100. The receipt output module 106 generates a receipt by inserting the total amount into this format. As item descriptions for the receipt, contents corresponding to the item information included in the lump-sum payment are set. A receipt screen G13 including this receipt is displayed on the user terminal 30. The full name registered in the first database DB1 is automatically input to an input form F130. The user can change the name of the receipt from the input form F130. When the user selects a button B131, the first server 10 transmits the data of this receipt to an email address of the user. It is assumed that this email address is registered in the first database DB1. The data of the receipt can be transmitted through use of any means including an SNS or a message app. The output of a receipt is to display a screen of the receipt on the user terminal 30 or to transmit the data of the receipt to the user.

According to Modification Example 8, the receipt for the total amount of the lump-sum payment is output, thereby enhancing the convenience of the user. For example, when the user visits the stadium with his or her customer for entertainment, the electronic payment used in the stadium may be a mixture of electronic payment for the entertainment and electronic payment for a private purpose. In this respect, it is possible to output a receipt that can be submitted for entertainment expenses by setting only those that can be submitted for entertainment expenses as the targets of the lump-sum payment, thereby enhancing the convenience of the user.

[5-9. Modification Example 9]

Figure 19:
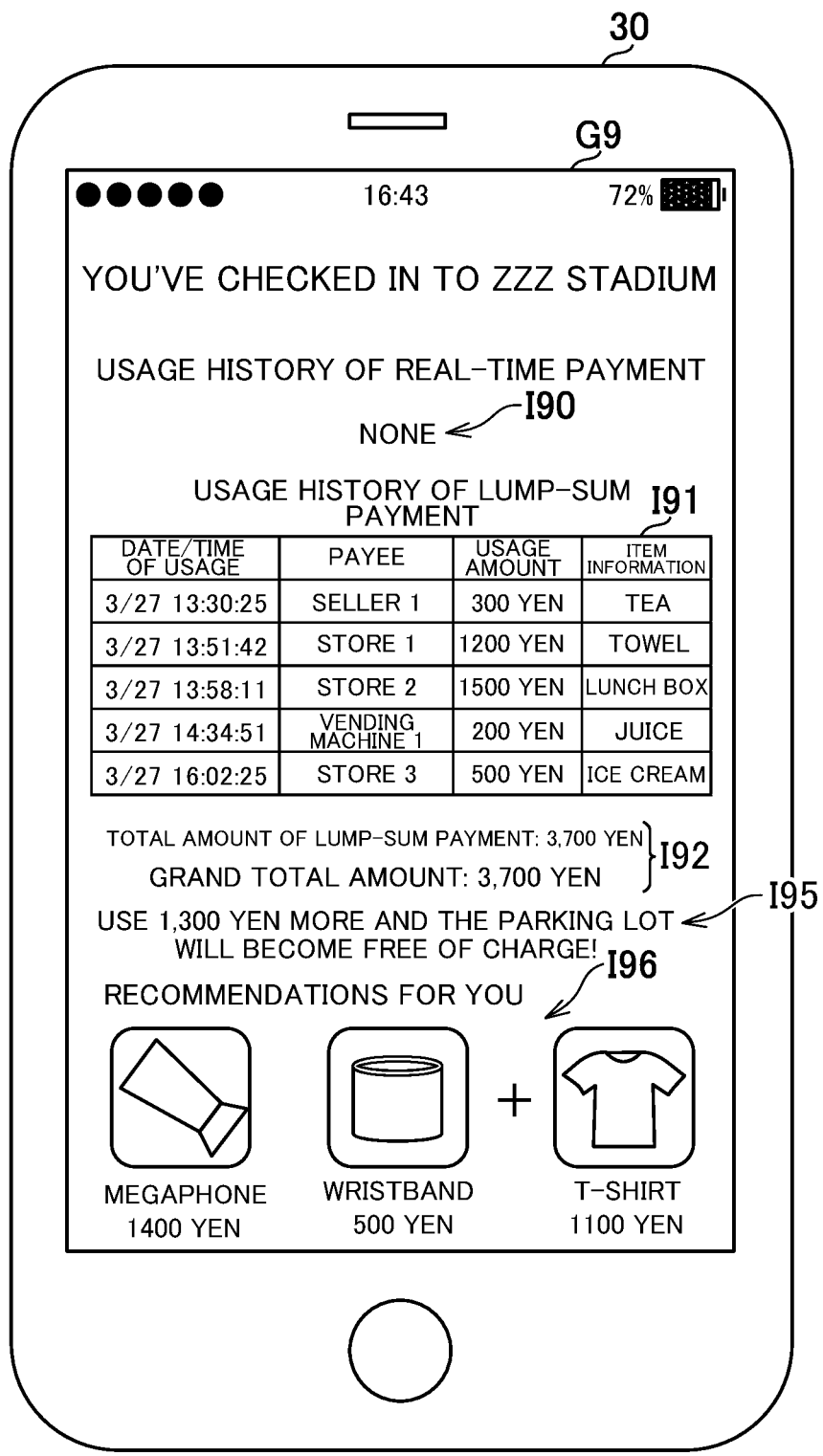
FIG. 19 is a view for illustrating an example of a history confirmation screen in Modification Example 9 of the present disclosure.

FIG. 19 is a view for illustrating an example of the history confirmation screen G9 in Modification Example 9 of the present disclosure. As illustrated in FIG. 19, for example, on the history confirmation screen G9, an information piece I95 relating to a privilege to be given to the user and an information piece I96 on recommendations for the stadium are displayed. In the example of FIG. 19, it corresponds to the privilege that a parking lot attached to the stadium is offered for free of charge. This privilege may be given electronically as data, or may be given when, for example, the user terminal 30 is shown to staff in the stadium. When the user spends a predetermined amount (5,000 yen in FIG. 19) in the stadium, the parking lot becomes free of charge. The information piece I95 indicates a remaining amount required for the parking lot of the stadium to become free of charge. In the information piece I96, products that can cover a shortfall for achieving the parking lot being free of charge may be displayed.

The electronic payment system S according to Modification Example 9 includes the usage amount acquisition module 107 for acquiring the usage amounts of a plurality of payment requests, and the information providing module 108 for providing information corresponding to the plurality of usage amounts to the user. The usage amounts are included in the usage history stored in the first database DB1, and hence the usage amount acquisition module 107 refers to the first database DB1 and acquires the usage amounts of a series of services used by the user in the stadium. The first database DB1 also includes records of the usage history of electronic payment used outside the stadium, and hence the usage amount acquisition module 107 acquires the usage amounts of the electronic payment used in the stadium from the records of the usage history of a certain user. The electronic payment used in the stadium may be identified from the payee included in the usage history, but in Modification Example 9, the check-in to the stadium is executed, and hence the electronic payment used in the stadium is identified from the date/time of usage included in the usage history.

The information providing module 108 provides the information pieces I90 to I92, I95, and I96 to the user through use of the first app. The information corresponding to the usage amounts refers to information having contents changed depending on the usage amounts. This information is information relating to the stadium visited by the user. For example, this information is each individual usage amount itself, the total amount of the usage amounts, a shortfall for achieving a predetermined amount, recommendation information corresponding to the usage amounts, or the coupon information corresponding to the usage amounts. It is assumed that data required for providing those pieces of information is stored in the first server 10 or another computer.

The providing as used herein is to supply information to the user through use of some means. In Modification Example 9, a case in which displaying an image through use of the screen of the first app corresponds to the providing is described, but the providing may be performed through use of other means. For example, displaying an image through use of an app other than the first app or a browser may correspond to the providing. Further, for example, transmitting information through use of messaging such as email may correspond to the providing. Further, for example, the providing of information is not limited to the providing of visual information, and may be the providing of information using voice such as voice mail.

As in Modification Example 9, in the case in which the user is given a predetermined privilege when the user has spent a predetermined amount or more at the stadium, the information providing module 108 may calculate an amount required for the privilege based on a plurality of usage amounts acquired by the usage amount acquisition module 107, and provide the calculated amount to the user as the information piece I95.

The privilege refers to what causes some benefit to the user. The privilege may be a tangible object or an intangible object such as data. The privilege may be the right of the user to do something. In Modification Example 9, a case in which a free ticket for the parking lot corresponds to the privilege is described. Accordingly, the free ticket for the parking lot as used herein can be read as "privilege". The privilege is not limited to the example of Modification Example 9. As the privilege itself, a publicly known privilege can be used, and the privilege may be, for example, a coupon, a discount, a product itself, or some kind of voucher.

The information providing module 108 calculates a difference between a reference amount for obtaining the privilege and the total amount calculated above as the amount required for the privilege. For example, the information providing module 108 provides the calculated amount to the user as the information piece I95. Further, for example, the information providing module 108 searches for a product or a combination of products that costs the calculated amount or more to provide the product or the combination of products to the user as the information piece I96. It is assumed that information including, for example, the prices of products is stored in the data storage unit 100.

According to Modification Example 9, the information corresponding to the usage amounts of the plurality of payment requests is provided to the user, thereby being capable of providing information useful to the user.

[5-10. Modification Example 10]

For example, in the case in which the first service is a service that provides electronic payment using the user terminal 30, the user is required to take out the user terminal 30 when he or she attempts to execute the electronic payment. In view of this, it is investigated to execute electronic payment through use of biometric authentication in order to save trouble of taking out the user terminal 30. For example, when the authentication at the time of electronic payment is completed only by face authentication of the user, the user is not required to take out the user terminal 30.

However, some users of the first service may include a certain user having a face similar to that of another user. In this case, when a certain user attempts to execute electronic payment based on face authentication, the certain user may be erroneously authenticated as another user having a similar face, thereby inhibiting appropriate electronic payment from being executed. There is also a fear in that a malicious third party who does not use the first service may impersonate a user with a similar face to execute electronic payment through use of, for example, a credit card of this user.

In view of this, in Modification Example 10 of the present disclosure, electronic payment based on face authentication is permitted for a certain user as long as this certain user stays in a place checked in by the user. The number of humans staying in this area is limited, and hence it is extremely unlikely that anyone may have such a similar face that face authentication becomes successful. At the time of the check-in, secure confirmation of the identity of the user (so-called possession authentication) is performed through use of the user terminal 30, and hence a range of electronic payment based on face authentication is limited to the place checked in by the user, thereby being capable of guaranteeing security while enhancing the convenience of the user.

Figure 20:
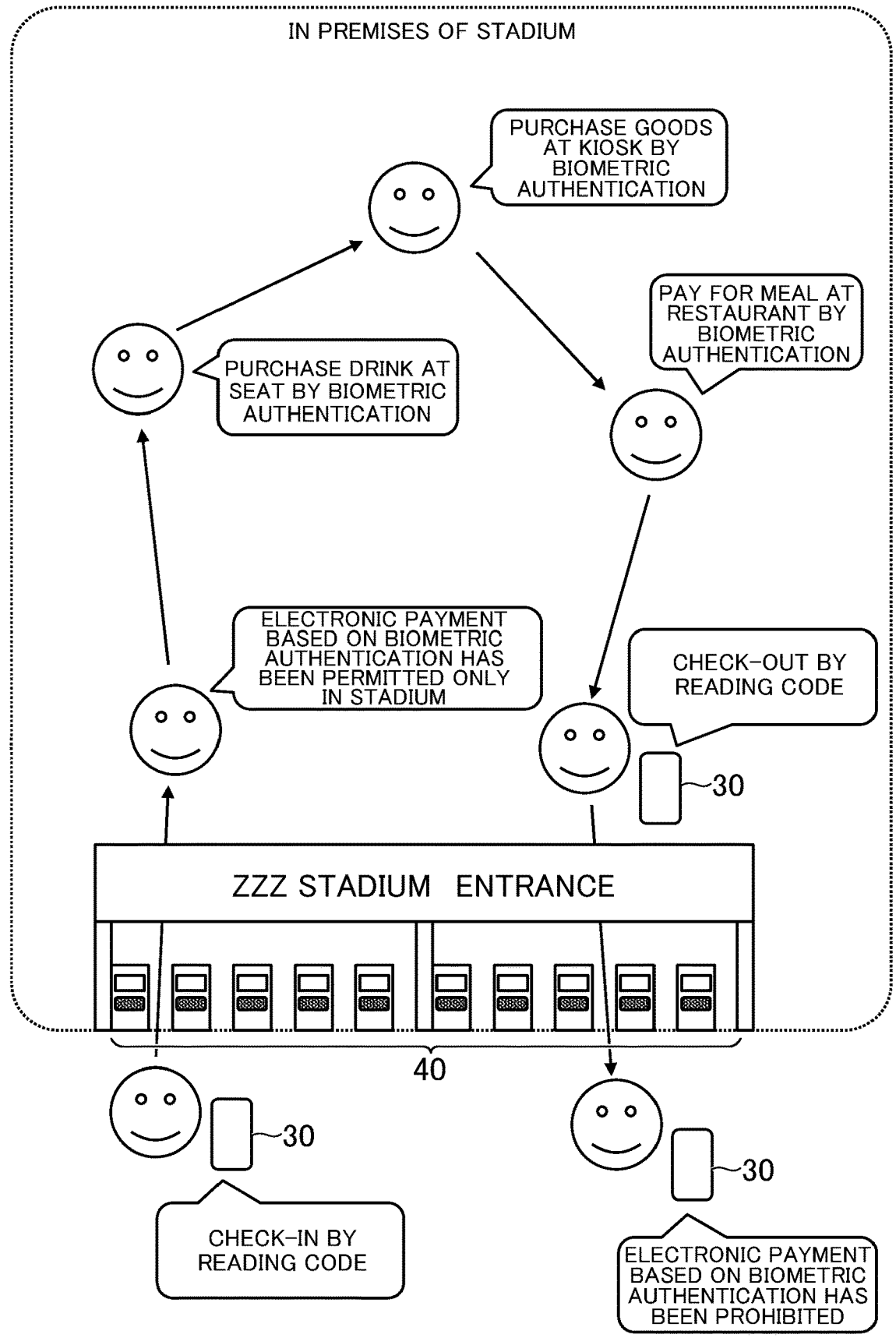
FIG. 20 is a diagram for illustrating an example of an electronic payment system according to Modification Example 10 of the present disclosure.

FIG. 20 is a diagram for illustrating an example of the electronic payment system S according to Modification Example 10. As illustrated in FIG. 20, when the user checks in to the stadium in the same manner as in the at least one embodiment, the payment terminals 50 that are arranged in the stadium enable the electronic payment based on the biometric authentication. Accordingly, the user is not required to cause the code C40 to be displayed.

The payment terminal 50 is an example of an authentication device. Accordingly, the payment terminal 50 as used herein can be read as "authentication device". The authentication device may be any device capable of biometric authentication. When the electronic payment execution module 103 executes electronic payment through use of the user terminal 30 of the user, the authentication device for executing the biometric authentication of the user is arranged in the stadium. In Modification Example 10, a case in which the face authentication corresponds to the biometric authentication is described, but as the biometric authentication itself, any biometric authentication can be used. For example, fingerprint authentication, vein authentication, voiceprint authentication, or other authentication may be used.

The first database DB1 in Modification Example 10 stores authentication information to be used for the biometric authentication in association with the user ID. This authentication information is information being a correct answer in the biometric authentication, and may be, for example, a facial feature amount, a face photograph, a fingerprint pattern, a vein pattern, or a voiceprint pattern. The user uploads information (for example, face photograph) required for registering the authentication information onto the first server 10 at a time of setting the use of the first service. The first server 10 stores the authentication information in association with the user ID of this user based on the uploaded information.

The electronic payment system S according to Modification Example 10 includes the permission module 109 for permitting, when the check-in has been executed, the electronic payment to be executed based on the biometric authentication in the stadium without the use of the user terminal 30. The first server 10 acquires, from the second server 20, the user ID of the user for which the check-in has been executed. Instead of acquiring this user ID from the second server 20, the first server 10 may hold, in the data storage unit 100, the user ID transmitted to the second server 20 at the time of the check-in.

For example, the permission module 109 associates the user ID of the user who has checked in to the stadium with information indicating that the electronic payment based on the biometric authentication has been permitted. The association therebetween may be held in the first database DB1, or may be held in another database. The electronic payment execution module 103 executes the electronic payment for the user permitted to use the electronic payment based on the biometric authentication when the biometric authentication of this user is successful.

The electronic payment execution module 103 does not execute the electronic payment based on the biometric authentication for the user who is not permitted to use the electronic payment based on the biometric authentication. The electronic payment execution module 103 does not execute even for the user permitted to use the electronic payment based on the biometric authentication when a request for the electronic payment based on the biometric authentication is received from a computer outside the stadium. Even when another user who has a face similar to the face of the user who has checked in to the stadium is registered in the first database DB1, the another user has not checked in, and hence the information on the another user is not determined at a time of determination of the biometric authentication. Accordingly, the payment information including, for example, the credit card information on the another user is not used.

In the example of FIG. 20, when the user purchases a drink at the seat in the stadium, the user has his or her own face photographed by a camera of the payment terminal 50 held by a seller. The payment terminal 50 transmits the photographed image to the first server 10 together with its own terminal ID. When the first server 10 receives the terminal ID and the photographed image, the electronic payment execution module 103 calculates the facial feature amount from the photographed image. The electronic payment execution module 103 acquires the authentication information on the user who has checked in to the stadium among the pieces of authentication information stored in the first database DB1.

The electronic payment execution module 103 executes the biometric authentication based on the calculated facial feature amount and the acquired authentication information. As the biometric authentication itself, a publicly known method can be used, and it suffices that success or failure may be determined based on a similarity degree of the facial feature amounts. When biometric authentication other than the face authentication is used, a publicly known method can similarly be used as the biometric authentication itself. It suffices that the authentication information to be subjected to the determination at a time of the authentication is limited to only the authentication information on the user who has checked in.

The electronic payment execution module 103 executes the electronic payment when the biometric authentication is successful. The electronic payment execution module 103 refers to the first database DB1 to acquire the credit card information or other such payment information associated with the authentication information similar to the calculated facial feature amount. The electronic payment execution module 103 executes electronic payment based on this payment information. As illustrated in FIG. 20, when the user purchases goods at a shop in the stadium and eats at a restaurant in the stadium, the electronic payment is similarly permitted only based on the face recognition.

The permission module 109 prohibits the electronic payment based on the biometric authentication when the user has checked out, when a predetermined time period has elapsed since the check-in, or when a predetermined time has arrived after the check-in. In the example of FIG. 20, when the user holds the code C60 of the user terminal 30 over the check-in terminal 40 to check out, the permission module 109 updates the first database DB1 so as to inhibit the biometric authentication from being permitted.

According to Modification Example 10, when the check-in is executed, it is permitted to execute the electronic payment based on the biometric authentication in the stadium without the use of the user terminal, thereby being capable of enhancing the convenience of the user. In addition, a range in which the electronic payment based on the biometric authentication is permitted is limited to the inside of the stadium, thereby being capable of preventing erroneous authentication and impersonation and enhancing the security.

[5-11. Modification Example 11]

For example, the modification examples described above may be combined.

Further, for example, a procedure for the check-out may be omitted. In this case, the user may instruct the lump-sum payment from the user terminal 30. Further, for example, the code for the electronic payment and the code for the check-in may be the same. The code for the check-in and the code for the check-out may be different. It may be possible to check in to a plurality of places regarding the second service by one code. That is, the first service may be linked to a plurality of second services. When the first service is linked to a plurality of second services, information corresponding to the plurality of usage amounts may be displayed for each of the second services on the history confirmation screen G9.

Further, for example, the case in which the check-in is executed by the user holding the user terminal 30 over the check-in terminal 40 has been described, but the check-in may be executed by causing the check-in terminal 40 to read some ID recorded on the IC chip 37 instead of using the image. Further, for example, the check-in may be executed only by any one of the user terminal 30 or the check-in terminal 40. For example, when a code posted in a place such as the stadium or displayed on some computer is photographed by the photographing unit 36 of the user terminal 30, information that can identify this place and the code ID stored in the user terminal 30 may be transmitted from the user terminal 30 to the first server 10. In this case, the check-in terminal 40 is not required.

Further, for example, the check-in may be executed when the current position detected by the GPS reception unit 38 of the user terminal 30 has become near the stadium. In this case, the check-in terminal 40 is not required. Further, for example, the check-in may be executed by the user reading the IC card or the magnetic card by the check-in terminal 40. In this case, the user terminal 30 is not required. It is assumed that the first server 10 and the second server 20 store a relationship between the user ID described in the at least one embodiment and the ID included in the IC card or the magnetic card. As another example, the user may execute the check-in based on the biometric authentication from the check-in terminal 40. In this case as well, the user terminal 30 is not required. It is assumed that the first server 10 and the second server 20 store a relationship between the user ID described in the at least one embodiment and biometric information on the user.

Further, for example, the first server 10 and the second server 20 are not required to be separately provided, and each of the functions may be implemented by one computer. Further, for example, the functions described as those implemented by the first server 10 may be shared by a plurality of computers. Further, for example, the functions described as those implemented by the second server 20 may be shared by a plurality of computers. Each of the functions may be implemented by at least one computer.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An electronic payment system which receives a plurality of payment requests from a user for electronic payment at a predetermined event venue to purchase service vouchers or products from different vendors, wherein the service vouchers or products are purchased by the user at different times during an event and at different locations within the predetermined event venue, wherein the electronic payment system comprises at least one computer server in electronic communication via a network with: a user computing terminal, a plurality of payment computing terminals comprising a plurality of POS terminals, and at least one check-in computing terminal, and wherein a plurality of payment terminals are positioned at a plurality of locations within the predetermined event venue and correspond to the plurality of services, the plurality of payment terminals being configured to obtain the plurality of payment requests based on obtaining a purchase ID from the user computing terminal by reading a code displayed on the user computing terminal when the user visits one from among the plurality of payment terminals, the electronic payment system comprising:
at least one memory configured to store computer program code; and
at least one processor configured to read the program code and operate as instructed by the program code, the program code comprising:
display code configured to cause at least one of the at least one processor to transmit information to the user computer terminal to cause the user computer terminal to display a user interface for selecting a payment scheme from among:
- a real-time payment scheme to be separately executed for a first plurality of payment requests from among the plurality of payment requests, and
- a lump-sum payment scheme to be collectively executed for the first plurality of payment requests, wherein the user interface allows the payment scheme to be selected on a purchase-by-purchase basis; and first executing code configured to cause at least one of the at least one processor to:
- receive, from the at least one check-in computing terminal, based on the user checking in at the predetermined event venue, a user ID corresponding to the user computing terminal;
- generate the purchase ID, wherein the purchase ID corresponds to the user, and wherein the purchase ID is based on the user ID and a user payment account previously set by the user and stored by the electronic payment system;
- receive, from the user computing terminal, first selection information indicating, for the first plurality of payment requests, a selected payment scheme from among the real-time payment scheme and the lump-sum payment scheme;
- receive the first plurality of payment requests from the plurality of payment terminals;
- determine, for the first plurality of payment requests, whether the real-time payment scheme or the lump-sum payment scheme has been selected based on the first selection information;
- based on determining the lump-sum payment scheme has been selected for the first plurality of payment requests, temporarily suspend payment for the first plurality of payment requests;
- generate a usage history of a plurality of purchases corresponding to the first plurality of payment requests;
- transmit information based on the usage history to the user computing terminal to cause the user computing terminal to display a list of purchases from the usage history;
- receive a confirmation from the user computing terminal corresponding to the usage history;
- transmit information to the user computing terminal to cause the user computing terminal to display a completion screen indicating the lump-sum payment scheme as the payment scheme, a date and time of a corresponding payment request of the first plurality of payment requests, and an amount of the corresponding payment request; and
- receive, from the at least one check-in computing terminal, the purchase ID of the user and execute the lump-sum payment for the first plurality of payment requests based on at least one of: a predetermined date and time being reached, a predetermined time period having elapsed, or the event ending.

2. The electronic payment system according to claim 1, wherein the program code further comprises determining code and second executing code,
wherein the determining code is configured to cause at least one of the at least one processor to determine which of the real-time payment or the lump-sum payment is to be executed after the user checks into the predetermined event venue, and
wherein the second executing code is configured to cause at least one of the at least one processor to execute one from among the real-time payment and the lump-sum payment for a second plurality of payment requests, from among the plurality of payment requests, after the user checks into the predetermined event venue.

3. The electronic payment system according to claim 2, wherein the program code further comprises checkout code configured to cause at least one of the at least one processor to execute check-out of the user from the predetermined event venue via at least one of the user computing terminal, the at least one check-in computing terminal, or another terminal at the predetermined event venue,
wherein the determining code is configured to cause at least one of the at least one processor to determine which of the real-time payment or the lump-sum payment is to be executed before the user checks out of the predetermined event venue, and
wherein the second executing code is configured to cause at least one of the at least one processor to execute one from among the real-time payment and the lump-sum payment for the second plurality of payment requests before the user checks out of the predetermined event venue.

4. The electronic payment system according to claim 1, wherein the program code further comprises determining code configured to cause at least one of the at least one processor to:
- receive from the user computing terminal second selection information of one from among the real-time payment scheme and the lump-sum payment scheme; and
- determine, based on the second selection information, which of the real-time payment or the lump-sum payment is to be executed.

5. The electronic payment system according to claim 1, wherein the program code further comprises determining code configured to cause at least one of the at least one processor to:
- acquire a reliability level of the user for electronic payment; and
- determine, based on the reliability level, which of the real-time payment or the lump-sum payment is to be executed for a second plurality of payment requests from among the plurality of payment requests.

6. The electronic payment system according to claim 1, wherein the program code further comprises determining code and second executing code,
wherein the determining code is configured to cause at least one of the at least one processor to:
- determine, as each of a second plurality of payment requests, from among the plurality of payment requests, are received, which of the real-time payment or the lump-sum payment is to be executed; and
- exclude, from the lump-sum payment for the second plurality of payment requests, one or more payment requests for which the real-time payment has already been executed, and wherein the second executing code is configured to cause at least one of the at least one processor to execute the lump-sum payment for one or more payment requests for which the real-time payment has not been executed.

7. The electronic payment system according to claim 1, wherein the program code further comprises determining code and second executing code, wherein the determining code is configured to cause at least one of the at least one processor to determine one from among the real-time payment- and the lump-sum payment to be executed for a payment request received via a payment application installed on the user computing terminal, and wherein the second executing code is configured to cause at least one of the at least one processor to execute one from among the real-time payment and the lump-sum payment based on the payment request received via the payment application.

8. The electronic payment system according to claim 1, wherein the program code further comprises second executing code is configured to cause at least one of the at least one processor to:
determine, prior to the lump-sum payment being executed for a second plurality of payment requests from among the plurality of payment requests, whether a total amount of a sum of usage amounts of the second plurality of payment requests is equal to or larger than a threshold value;
change the lump-sum payment scheme to the real-time payment scheme based on the total amount being equal to or larger than the threshold value; and
execute the real-time payment each time a payment request is received after the lump-sum payment scheme has been changed to the real-time payment scheme.

9. The electronic payment system according to claim 1, wherein the program code further comprises second executing code configured to cause at least one of the at least one processor to:
determine, prior to the lump-sum payment being executed, whether a total amount of a sum of usage amounts of a second plurality of payment requests, from among the plurality of payment requests, is equal to or larger than a threshold value; and
execute the lump-sum payment for the second plurality of payment requests based on the total amount being equal to or larger than the threshold value.

10. The electronic payment system according to claim 1, wherein the program code further comprises determining code configured to cause at least one of the at least one processor to determine, based on a balance of a payment method of the user, which of the real-time payment or the lump-sum payment is to be executed for a second plurality of payment requests from among the plurality of payment requests.

11. The electronic payment system according to claim 1, wherein the program code further comprises determining code configured to cause at least one of the at least one processor to determine, for a second plurality of payment requests from among the plurality of payment requests, which of the real-time payment or the lump-sum payment is to be executed based on, a first payment method among a plurality of payment methods of the user, wherein the first payment method is selected by the user.

12. The electronic payment system according to claim 1, wherein the program code further comprises determining code and second executing code,
wherein the determining code is configured to cause at least one of the at least one processor to: determine, prior to the lump-sum payment being executed for a second plurality of payment requests, whether a balance of a payment method of the user is equal to or larger than a total value of a sum of usage amounts of the second plurality of payment requests, and wherein the second executing code is configured to cause at least one of the at least one processor to execute the lump-sum payment for the second plurality of payment requests based on the balance being equal to or larger than the total value.

13. The electronic payment system according to claim 12, wherein the second executing code is configured to cause at least one of the at least one processor to:
receive, from the user computing terminal, an execution instruction for the lump-sum payment;
execute the lump-sum payment for the second plurality of payment requests based on the execution instruction being received; and
transmit information to the user computing terminal to cause the user computing terminal to display a predetermined notification to the user based on the balance being smaller than the total value before the execution instruction is received.

14. The electronic payment system according to claim 1, wherein the program code further comprises second executing code configured to cause at least one of the at least one processor to transmit information to the user computing terminal to cause the user computing terminal to display a receipt for a total amount of the lump-sum payment based on the lump-sum payment being executed.

15. The electronic payment system according to claim 1,
wherein a first service provides the electronic payment and a second service relates to the predetermined event venue, and
wherein the program code further comprises second executing code configured to cause at least one of the at least one processor to:
acquire first information for identifying the user for the first service via at least one of transmission from the user computing terminal or transmission from one check-in computing terminal from among the at least one check-in computing terminal at the predetermined event venue; and
execute check-in to the predetermined event venue based on one of second information associated with the first information or the first information.

16. The electronic payment system according to claim 1, wherein the program code further comprises usage code configured to cause at least one of the at least one processor to:
acquire a plurality of usage amounts of the first plurality of payment requests; and
transmit information corresponding to the plurality of usage amounts to the user computing terminal.

17. The electronic payment system according to claim 2,
wherein an authentication device for executing biometric authentication of the user is disposed at the predetermined event venue, and
wherein the program code further comprises third executing code configured to cause at least one of the at least one processor to:
execute the electronic payment via the user computing terminal; and
permit, based on check-in being executed for the user, the electronic payment to be executed based on the biometric authentication without use of the user computing terminal.

18. An electronic payment method of an electronic payment system for receiving a plurality of payment requests from a user for electronic payment at a predetermined place venue to purchase service vouchers or products from different vendors, wherein the service vouchers or products are purchased by the user at different times during an event and at different locations within the predetermined event venue,
wherein the electronic payment system includes at least one computer server in electronic communication via a network with: a user computing terminal, a plurality of payment computing terminals comprising a plurality of POS terminals, and at least one check-in computing terminal,
wherein a plurality of payment terminals are positioned at a plurality of locations within the predetermined event venue and correspond to the plurality of services, the plurality of payment terminals being configured to obtain the plurality of payment requests based on obtaining a purchase ID from the user computing terminal by reading a code displayed on the user computing terminal when the user visits one from among the plurality of payment terminals,
the electronic payment method comprising:
transmitting information to the user computer terminal to cause the user computer terminal to display a user interface for selecting a payment scheme from among:
a real-time payment scheme to be separately executed for a first plurality of payment requests from among the plurality of payment requests, and
a lump-sum payment scheme to be collectively executed for the first plurality of payment requests,
wherein the user interface allows the payment scheme to be selected on a purchase-by-purchase basis;
receiving, from the at least one check-in computing terminal, based on the user checking in at the predetermined event venue, a user ID corresponding to the user computing terminal;
generating the purchase ID, wherein the purchase ID corresponds to the user, and wherein the purchase ID is based on the user ID and a user payment account previously set by the user and stored by the electronic payment system;
receiving, from the user computing terminal, first selection information indicating, for the first plurality of payment requests, a selected payment scheme from among the real-time payment scheme and the lump-sum payment scheme;
receiving the first plurality of payment requests from the plurality of payment terminals;
determining, for the first plurality of payment requests, whether the real-time payment scheme or the lump-sum payment scheme has been selected based on the first selection information;
based on determining the lump-sum payment scheme has been selected for the first plurality of payment requests, temporarily suspending payment for the first plurality of payment requests;
generating a usage history of a plurality of purchases corresponding to the first plurality of payment requests;
transmitting information based on the usage history to the user computing terminal to cause the user computing terminal to display a list of purchases from the usage history;
receiving a confirmation from the user computing terminal corresponding to the usage history;
transmitting information to the user computing terminal to cause the user computing terminal to display a completion screen indicating the lump-sum payment scheme as the payment scheme, a date and time of a corresponding payment request of the first plurality of payment requests, and an amount of the corresponding payment request; and
receiving, from the at least one check-in computing terminal, the purchase ID of the user and executing the lump-sum payment for the first plurality of payment requests based on at least one of: a predetermined date and time being reached, a predetermined time period having elapsed, or the event ending.

19. A non-transitory information storage medium having stored thereon a program for causing a computer, which receives a plurality of payment requests from a user for electronic payment at a predetermined event venue to purchase service vouchers or products from different vendors, wherein the service vouchers or products are purchased by the user at different times during an event and at different locations within the predetermined event venue,
wherein the electronic payment system comprises at least one computer server in electronic communication via a network with: a user computing terminal, a plurality of payment computing terminals comprising a plurality of POS terminals, and at least one check-in computing terminal, and
wherein a plurality of payment terminals are positioned at a plurality of locations within the predetermined event venue and correspond to the plurality of services, the plurality of payment terminals being configured to obtain the plurality of payment requests based on obtaining a purchase ID from the user computing terminal by reading a code displayed on the user computing terminal when the user visits one from among the plurality of payment terminals,
the program being configured to cause the computer to:
transmit information to the user computer terminal to cause the user computer terminal to display a user interface for selecting a payment scheme from among:
a real-time payment scheme to be separately executed for a first plurality of payment requests from among the plurality of payment requests, and
a lump-sum payment scheme to be collectively executed for the first plurality of payment requests,
wherein the user interface allows the payment scheme to be selected on a purchase-by-purchase basis;
receive, from the at least one check-in computing terminal, based on the user checking in at the predetermined event venue, a user ID corresponding to the user computing terminal;
generate the purchase ID, wherein the purchase ID corresponds to the user, and wherein the purchase ID is based on the user ID and a user payment account previously set by the user and stored by the electronic payment system;
receive, from the user computing terminal, first selection information indicating, for the first plurality of payment requests, a selected payment scheme from among the real-time payment scheme and the lump-sum payment scheme;
receive the first plurality of payment requests from the plurality of payment terminals;
determine, for the first plurality of payment requests, whether the real-time payment scheme or the lump-sum payment scheme has been selected based on the first selection information;
based on determining the lump-sum payment scheme has been selected for the first plurality of payment requests, temporarily suspend payment for the first plurality of payment requests;
generate a usage history of a plurality of purchases corresponding to the first plurality of payment requests;
transmit information based on the usage history to the user computing terminal to cause the user computing terminal to display a list of purchases from the usage history;
receive a confirmation from the user computing terminal corresponding to the usage history;
transmit information to the user computing terminal to cause the user computing terminal to display a completion screen indicating the lump-sum payment scheme as the payment scheme, a date and time of a corresponding payment request of the first plurality of payment requests, and an amount of the corresponding payment request; and
receive, from the at least one check-in computing terminal, the purchase ID of the user and execute the lump-sum payment for the first plurality of payment requests based on at least one of: a predetermined date and time being reached, a predetermined time period having elapsed, or the event ending.

* * * * *